US012039891B1

(12) United States Patent
White

(10) Patent No.: US 12,039,891 B1
(45) Date of Patent: Jul. 16, 2024

(54) SYSTEM AND METHOD FOR EMULATING MULTIPLE AC MOTORS USING A SINGLE BASE STATION AND A PLURALITY OF INTERCHANGEABLE CARTRIDGES

(71) Applicant: Lester E. White, Middleboro, MA (US)

(72) Inventor: Lester E. White, Middleboro, MA (US)

(73) Assignee: NEIEP LLC, Attleboro Falls, MA (US)

( * ) Notice: Subject to any disclaimer, the term of this patent is extended or adjusted under 35 U.S.C. 154(b) by 672 days.

(21) Appl. No.: 17/315,805

(22) Filed: May 10, 2021

(51) Int. Cl.
  *G09B 9/00* (2006.01)
  *H02K 3/50* (2006.01)
  *H02K 7/02* (2006.01)

(52) U.S. Cl.
  CPC ............... *G09B 9/00* (2013.01); *H02K 3/50* (2013.01); *H02K 7/02* (2013.01); *H02K 2203/06* (2013.01)

(58) Field of Classification Search
  CPC .................................................... G09B 9/00
  See application file for complete search history.

(56) References Cited

U.S. PATENT DOCUMENTS

| 5,017,818 A * | 5/1991 | Dohogne | H02K 5/225 |
| | | | 310/71 |
| 5,611,691 A * | 3/1997 | Poulain | G09B 23/185 |
| | | | 434/338 |
| 11,227,508 B1 * | 1/2022 | Drew | G09B 19/00 |
| 2004/0056611 A1 * | 3/2004 | Mayhew | G05B 19/409 |
| | | | 318/16 |

FOREIGN PATENT DOCUMENTS

WO   WO-2017048279 A1 * 3/2017 ............... H02K 3/28

* cited by examiner

*Primary Examiner* — Jay Trent Liddle
*Assistant Examiner* — Alyssa N Brandley
(74) *Attorney, Agent, or Firm* — Salter & Michaelson

(57) ABSTRACT

A system is disclosed for emulating multiple alternating current (AC) motor configurations in an elevator training environment, the system including a base having a plurality of lead connections and a receptacle, a motor portion having motor windings and a flywheel that stores energy. The plurality of lead connections and the receptacle are adapted to receive each of a plurality of faceplate and cartridge pairs, respectively, to configure the motor windings according to one of a plurality of configurations. The system emulates a plurality of configurations including 3-wire wye, a 3-wire delta, a 6-wire, a 9-wire wye, a 9-wire delta, a 12-wire, a 6-wire puzzle, a 12-wire puzzle, a 3-wire delta shorted, and a 6-wire shorted configuration. Each receptacle and the corresponding cartridge can define a 24-pin connection. The lead connections can include at least twelve lead connection points.

21 Claims, 24 Drawing Sheets

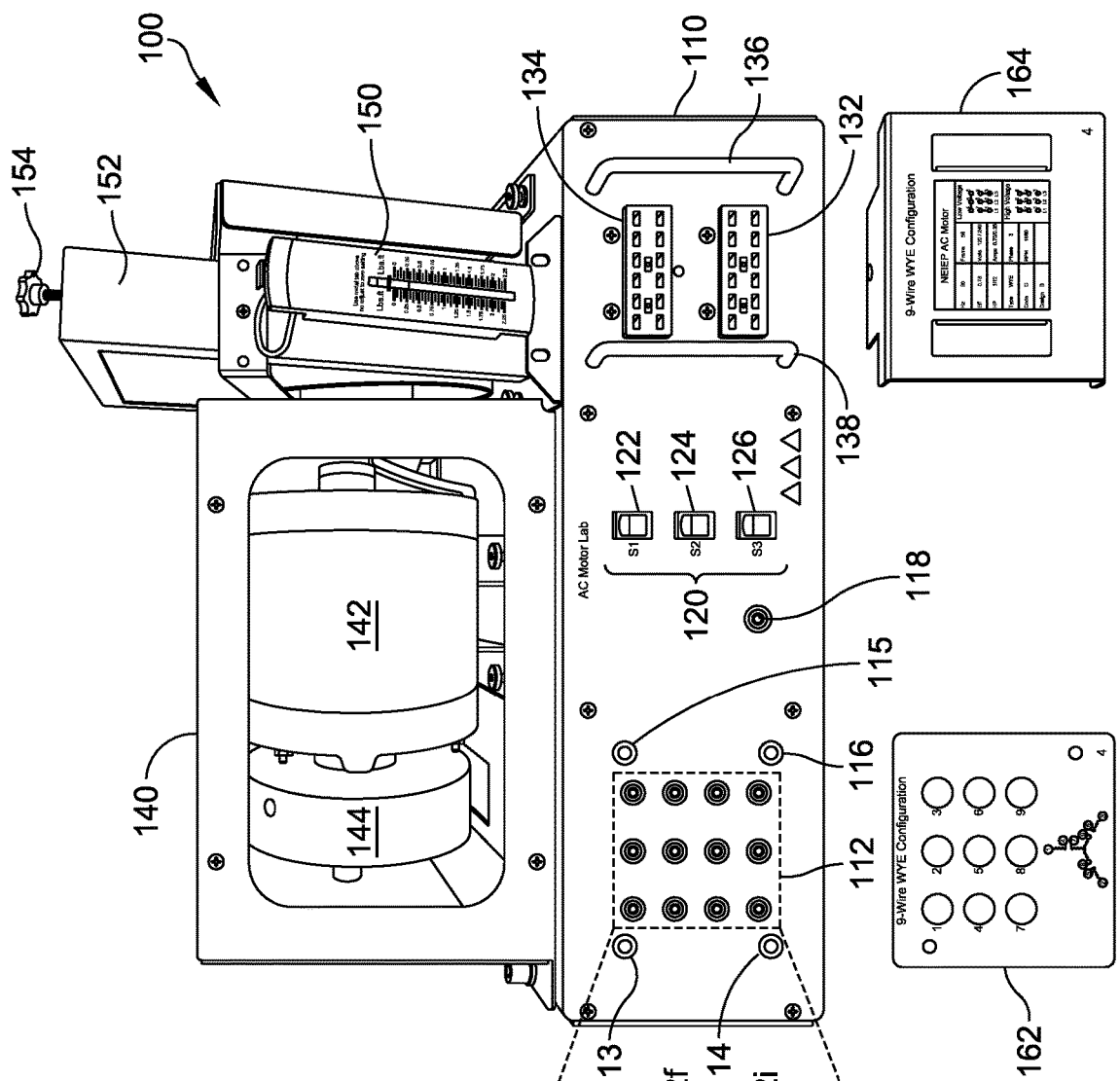
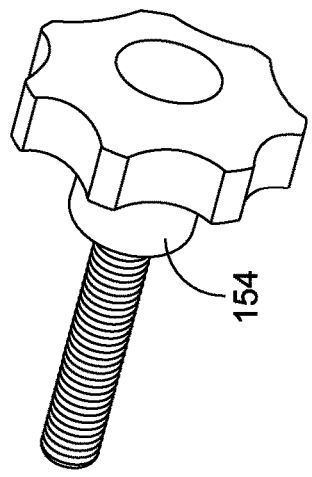
FIG. 1A
FIG. 1

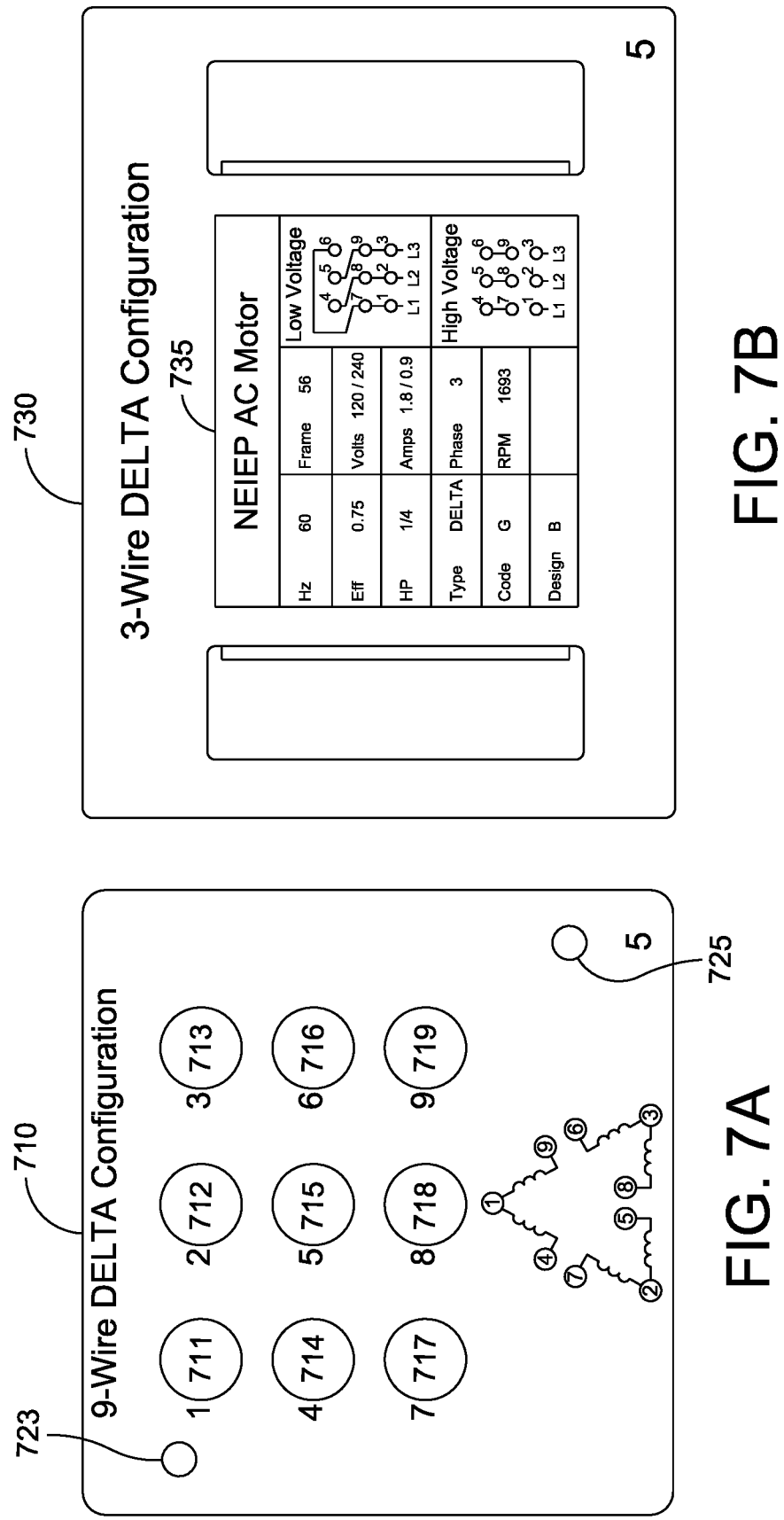

SYSTEM AND METHOD FOR EMULATING MULTIPLE AC MOTORS USING A SINGLE BASE STATION AND A PLURALITY OF INTERCHANGEABLE CARTRIDGES

FIELD OF THE INVENTION

The present invention relates in general to system and methods used in elevator teaching environments. The present invention more particularly relates to systems and methods for an alternating current (AC) motor used in an elevator teaching environment.

SUMMARY OF THE INVENTION

The present invention allows an individual to emulate multiple AC Motor configurations using a single base station, by implementing a plurality of interchangeable cartridges and a plurality of faceplates, with each cartridge having a respective faceplate. The faceplate allows for a motor to be connected to the appropriate connections of the base station to emulate the various AC motor configurations.

In one configuration, a system is disclosed for emulating multiple alternating current (AC) motor configurations in an elevator training environment. The system includes a base having a plurality of lead connections and a receptacle, a motor portion having motor windings and a flywheel, wherein the plurality of lead connections and the receptacle are adapted to receive each of a plurality of faceplate and cartridge pairs, respectively, to configure the motor windings according to one of a plurality of configurations.

In the system, each receptacle comprises a 24-pin connection that interfaces with a corresponding 24-pin connection on each cartridge. In the system, the plurality of configurations for the motor windings available via the plurality of faceplate and cartridge pairs includes (a) at least one 3-wire wye configuration faceplate and cartridge pair, (b) at least one 3-wire delta configuration faceplate and cartridge pair, (c) at least one 6-wire configuration faceplate and cartridge pair, (d) at least one 9-wire wye configuration faceplate and cartridge pair, (e) at least one 9-wire delta configuration faceplate and cartridge pair, (f) at least one 12-wire configuration faceplate and cartridge pair, (g) at least one 6-wire puzzle configuration faceplate and cartridge pair, (h) at least one 12-wire puzzle configuration faceplate and cartridge pair, (i) at least one 3-wire delta shorted configuration faceplate and cartridge pair, and (j) at least one 6-wire shorted configuration faceplate and cartridge pair. In the system, the plurality of lead connections comprise at least twelve connection points for connecting to a motor drive. In the system, each faceplate can have at least one opening corresponding to each lead connection that is used for each of the plurality of configurations. In the system, each faceplate includes a graphic indicating the motor configuration that corresponds to the respective faceplate. The system can further include a spring pull gauge operatively connected to the motor that is used to measure how much force is applied to a brake of the system. In the system, the base can further include a plurality of switches on the base for simulating faults as open windings.

Also disclosed is a system for emulating multiple alternating current (AC) motor configurations in an elevator training environment. The system includes a base having a plurality of lead connections and a receptacle, a motor portion having motor windings, a plurality of cartridges, and a configurable motor portion having motor windings.

In the system, each of the plurality of cartridges comprises a 24-pin connection that is configured to interface with the receptacle on the base. The system can further include a spring pull gauge operatively connected to the motor that is used to measure how much force is applied to a brake of the system. The system can further include a plurality of switches on the base for simulating faults such that the switches simulate open windings, and the cartridges are configured to simulate missing leads. The system can further include a plurality of faceplates that interface with the plurality of lead connections, wherein the plurality of cartridges and the plurality of faceplates comprise a plurality of cartridge and faceplate pairs that provide a different AC motor configuration such that each pair can be interchangeably used to configure the motor portion according to any one of the plurality of AC motor configurations in the elevator training environment.

Also disclosed is a system for emulating multiple alternating current (AC) motor configurations. The system includes a base having a plurality of lead connections and at least one receptacle, a configurable motor portion having motor windings, at least one cartridge configured to connect to the at least one receptacle, the at least one cartridge corresponding to at least one AC motor configuration, wherein the at least one faceplate indicates which of the plurality of lead connections should be used for the at least one AC motor configuration. The system can further include at least one faceplate corresponding to the at least one cartridge, the at least one faceplate configured to interface with at least some of the lead connections, the at least one faceplate corresponding to the at least one AC motor configuration, wherein the at least one faceplate indicates which of the plurality of lead connections should be used for the at least one AC motor configuration by covering the lead connections that should not be used. The system can further include at least a second cartridge configured to connect to the at least one receptacle, the second cartridge corresponding to a second AC motor configuration, different from the at least one AC motor configuration, and at least a second faceplate corresponding to the second cartridge, the second faceplate configured to interface with at least some of the lead connections. In the system, the at least one cartridge and the receptacle interface via a 24-pin connection. In the system, the plurality of configurations for the motor windings available via the plurality of faceplate and cartridge pairs includes at least (a) at least one 3-wire wye configuration faceplate and cartridge pair, (b) at least one 3-wire delta configuration faceplate and cartridge pair, (c) at least one 6-wire configuration faceplate and cartridge pair, (d) at least one 9-wire wye configuration faceplate and cartridge pair, (e) at least one 9-wire delta configuration faceplate and cartridge pair, and (f) at least one 12-wire configuration faceplate and cartridge pair. In the system, the plurality of configurations for the motor windings available via the plurality of faceplate and cartridge pairs can further include (g) at least one 6-wire puzzle configuration faceplate and cartridge pair, and (h) at least one 12-wire puzzle configuration faceplate and cartridge pair. In the system, the plurality of configurations for the motor windings available via the plurality of faceplate and cartridge pairs can further include (i) at least one 3-wire delta shorted configuration faceplate and cartridge pair; and (j) at least one 6-wire shorted configuration faceplate and cartridge pair.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 1 is a perspective front view of the system for emulating multiple AC motors including a base station, and showing a 9-wire wye faceplate and cartridge configuration, according to the present disclosure;

FIG. 1A is a perspective view of the brake drum knob;

FIG. 7A is a perspective view of the 9-wire delta faceplate, according to the present disclosure;

FIG. 7B is a perspective view of the 9-wire delta cartridge, that corresponds to the faceplate of FIG. 7A, according to the present disclosure.

DETAILED DESCRIPTION

Figure 2:
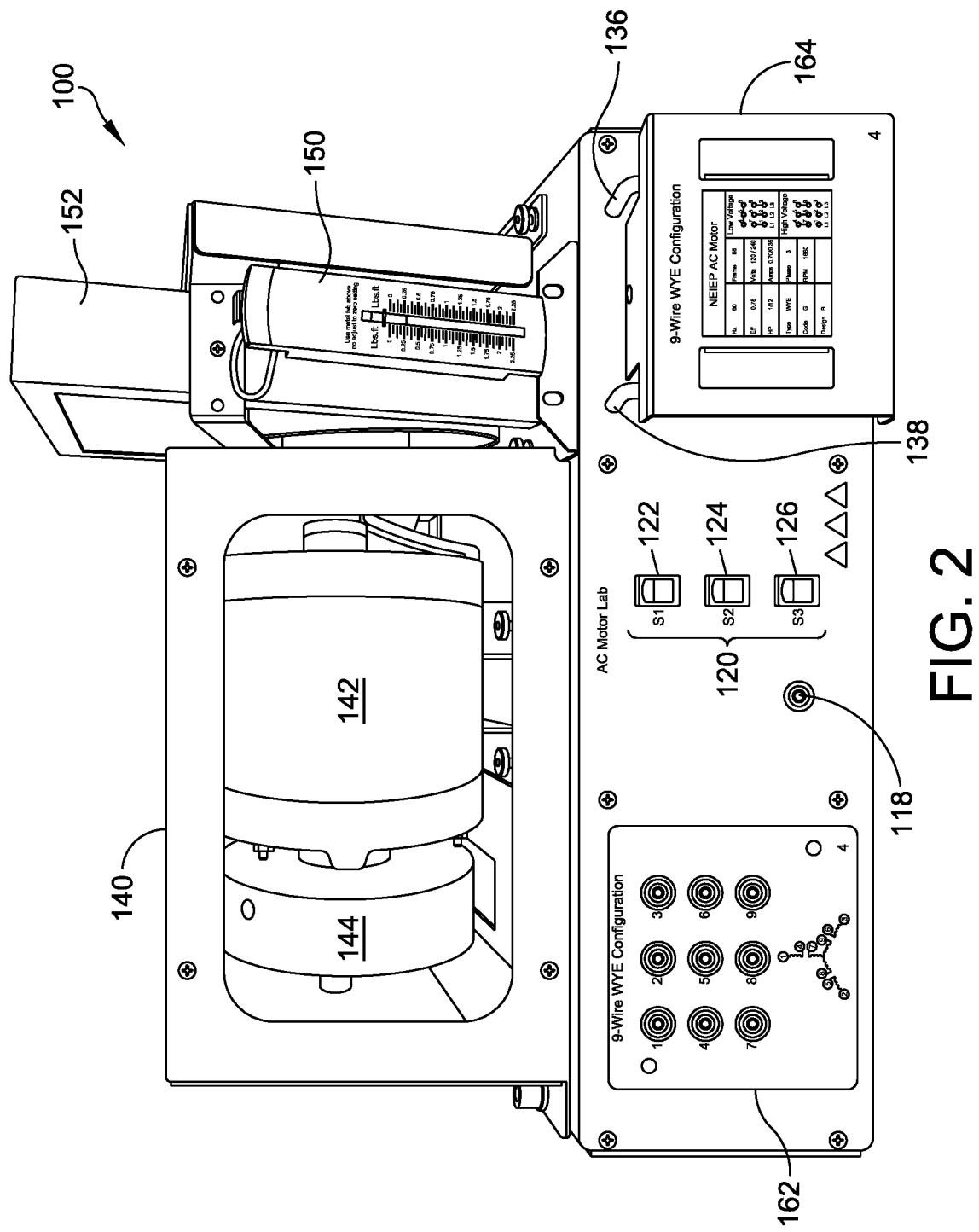
FIG. 2 is a perspective view of the base station with the faceplate and cartridge of FIG. 1 installed on the base station, according to the present disclosure.

In accordance with the present invention as illustrated in FIGS. 1-13, there is provided a system that is designed to allow students or other individuals to practice wiring and configuring multiple styles of three-phase motors to include 3-lead wye, 3-lead delta, 6-lead, 9-lead wye, 9-lead delta, and a 12-lead configuration. It also allows students to test the different characteristics of each of these types of motor configurations. The system additionally provides motor troubleshooting practice for both open and shorted windings as well as missed, or untagged, leads. The base uses an interchangeable cartridge system so that a single motor is used to represent all motors described herein, as well as any other motor configurations to which the teachings could apply that are not expressly disclosed herein but would be apparent to one having ordinary skill in the art. A faceplate can be paired with each cartridge to indicate to a student the available connections for a particular configuration for a corresponding cartridge. The faceplate works together with its corresponding cartridge to allow the cartridge to electrically configure the motor windings, while the faceplate presents the usable connections to the student. The cartridge system is also configured to simulate faults so that students can practice troubleshooting. The faults can be simulated using fault control switches on the base and/or the cartridges themselves. The switches are configured to simulate open windings and the cartridges are configured to simulate missing leads.

The system allows multiple alternating current (AC) motor configurations to be emulated using a single base station, by implementing a plurality of interchangeable cartridges and a plurality of faceplates, with each cartridge having a respective faceplate. Note that the faceplate is not required but eases instruction by indicating the lead connections that are to be utilized and covering the lead connections that are not utilized. An instruction sheet or other image could be used instead of the faceplate, for example. The faceplate allows for a motor to be connected to the appropriate connections of the base station to emulate the various AC motor configurations by providing at least one 3-wire wye configuration faceplate and cartridge pair, at least one 3-wire delta configuration faceplate and cartridge pair, at least one 6-wire configuration faceplate and cartridge pair, at least one 9-wire wye configuration faceplate and cartridge pair, at least one 9-wire delta configuration faceplate and cartridge pair, at least one 12-wire configuration faceplate and cartridge pair, at least one 6-wire puzzle configuration faceplate and cartridge pair, at least one 12-wire puzzle configuration faceplate and cartridge pair, at least one 3-wire delta shorted configuration faceplate and cartridge pair, and at least one 6-wire shorted configuration faceplate and cartridge pair.

FIG. 1 is a perspective front view of the system for emulating multiple AC motors including a base station, and showing a 9-wire wye faceplate and cartridge configuration, according to the present disclosure.

The AC Motor system 100 includes a base 110 having lead connections 112, posts 113, 116 and magnets 114, 115 for securing faceplate (162), fault control switches 120, a receptacle 132/134, and arms 136/138 to assist in removal of the cartridge 164. The lead connections 112 in this case include twelve lead connections 112a, 112b, 112c, 112d, 112e, 112f, 112g, 112h, 112i, 112j. 112k, and 112l. The base 110 includes a chassis ground 118 to provide a ground for the system 100. The fault control switches 120 include three switches 122, 124, 126 in this example case and are schematically shown as switches 120 in FIG. 3C for example.

The system 100 includes a motor portion 140 including AC motor windings 142 and a flywheel 144. The flywheel 144 spins when the motor is running, adding mechanical inertia necessary for observation of rotational direction and ramp up or ramp down of speed. Refer to FIG. 3C for example for a schematic diagram of the motor windings 142 (illustrated as motor windings 350 in FIG. 3C). A spring pull gauge 150 is provided in the system 100, the spring pull gauge 150 being suspended from an arm 152. The spring pull gauge 150 is used to measure how much force is applied to the brake. A knob 154, as shown in greater detail in FIG. 1A, is used to apply more pressure to the brake drum. When the knob is tightened, more pressure is applied to the brake drum, and a readout in pounds-per-foot (lbs./ft.) from the spring pull gauge is provided. Although a knob is shown as the means by which the pressure is applied to the brake drum, any appropriate tightening or loosening mechanism can be implemented, as will be appreciated by one having ordinary skill in the art. The starting torque can be extrapolated from the measurement of the amount of force, which can be measured in foot-pounds of torque.

As will be appreciated in light of the present disclosure, the system allows for multiple AC motor configurations to be achieved through multiple faceplate and cartridge pairs. The faceplate indicates which lead connections are used for a particular motor configuration and covers the lead connections that are not used. The cartridge configures the motor windings appropriately to correspond to the faceplate.

The faceplate 162 and cartridge 164 configuration allow for the motor windings 142 to be configured as a 9-wire wye configuration in this example. The system 100 allows for multiple faceplate and cartridge pairs to be implemented to configure the motor windings 142 according to multiple AC motor configurations.

Note that there are numbers 1, 2, 3, 4, 5, 6, 7, 8, and 9 listed on the faceplate with each number corresponding to a lead connection within an opening. Each number corresponds to the lead that will be selected on the 12-lead motor that is connected to the lead connections 112 within each opening. For example, in FIG. 1, the faceplate 162 has nine openings numbered 1, 2, 3, 4, 5, 6, 7, 8, and 9 which correspond, respectively, to lead connections 112a, 112b, 112c, 112d, 112e, 112f, 112g. 112h, and 112i. The faceplate 162 covers the lead connections 112j, 112k, and 112l as they are not used in this 9-wire wye configuration, as will be appreciated in light of the present disclosure.

FIG. 2 is a perspective view of the base station with the faceplate and cartridge of FIG. 1 installed on the base station, according to the present disclosure. The faceplate 162 and cartridge 164 are shown installed on the base 110. The faceplate 162 provides nine openings (1-9) that, when appropriately attached to a 12-lead motor, allow the motor windings to be configured as a 9-wire wye configuration so that the student can test the system 100 as a 9-wire wye motor. The faceplate includes two smaller holes that interface with the posts 113, 116 and the magnets 114, 115 interface with the faceplate to secure the faceplate over the lead connections 112.

Figure 3B:
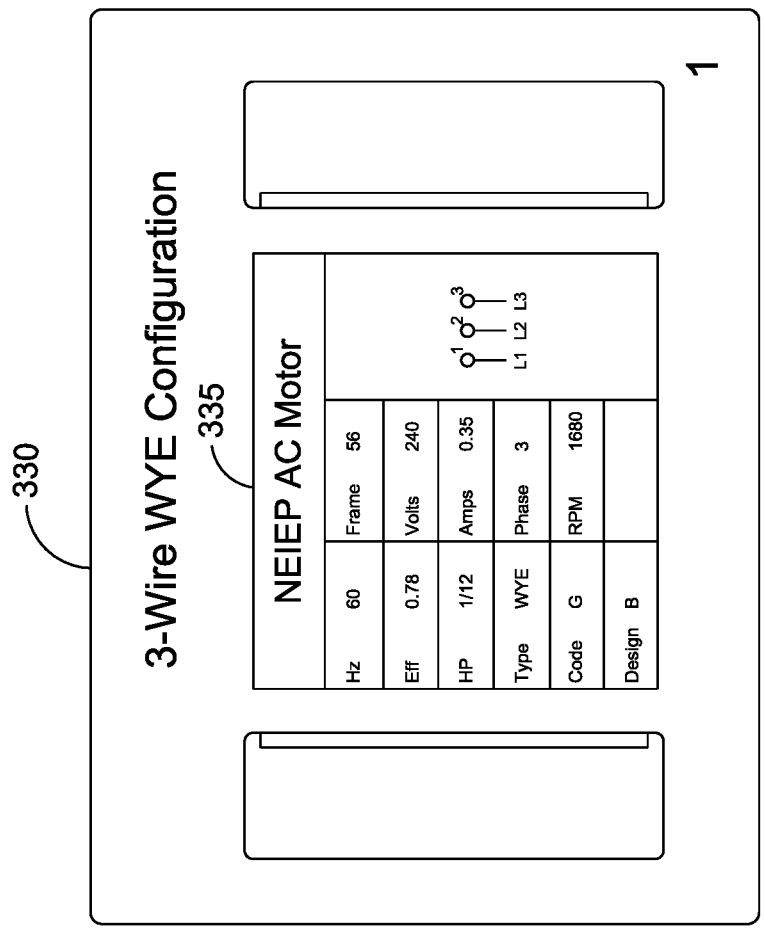
FIG. 3B is a perspective view of the 3-wire wye cartridge, that corresponds to the faceplate of FIG. 3A, according to the present disclosure.
Figure 3A:
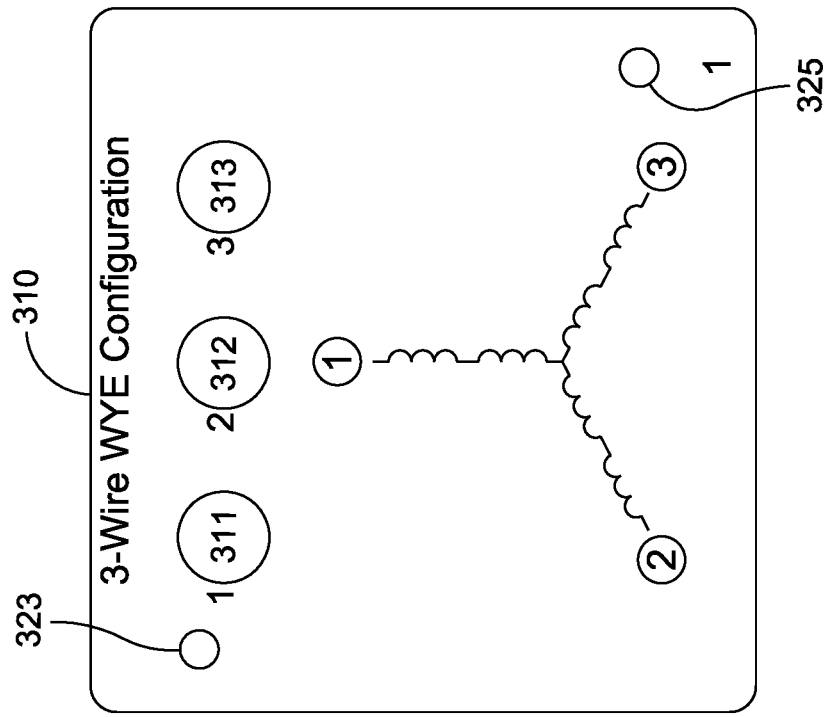
FIG. 3A is a perspective view of the 3-wire wye faceplate, according to the present disclosure.
Figure 3C:
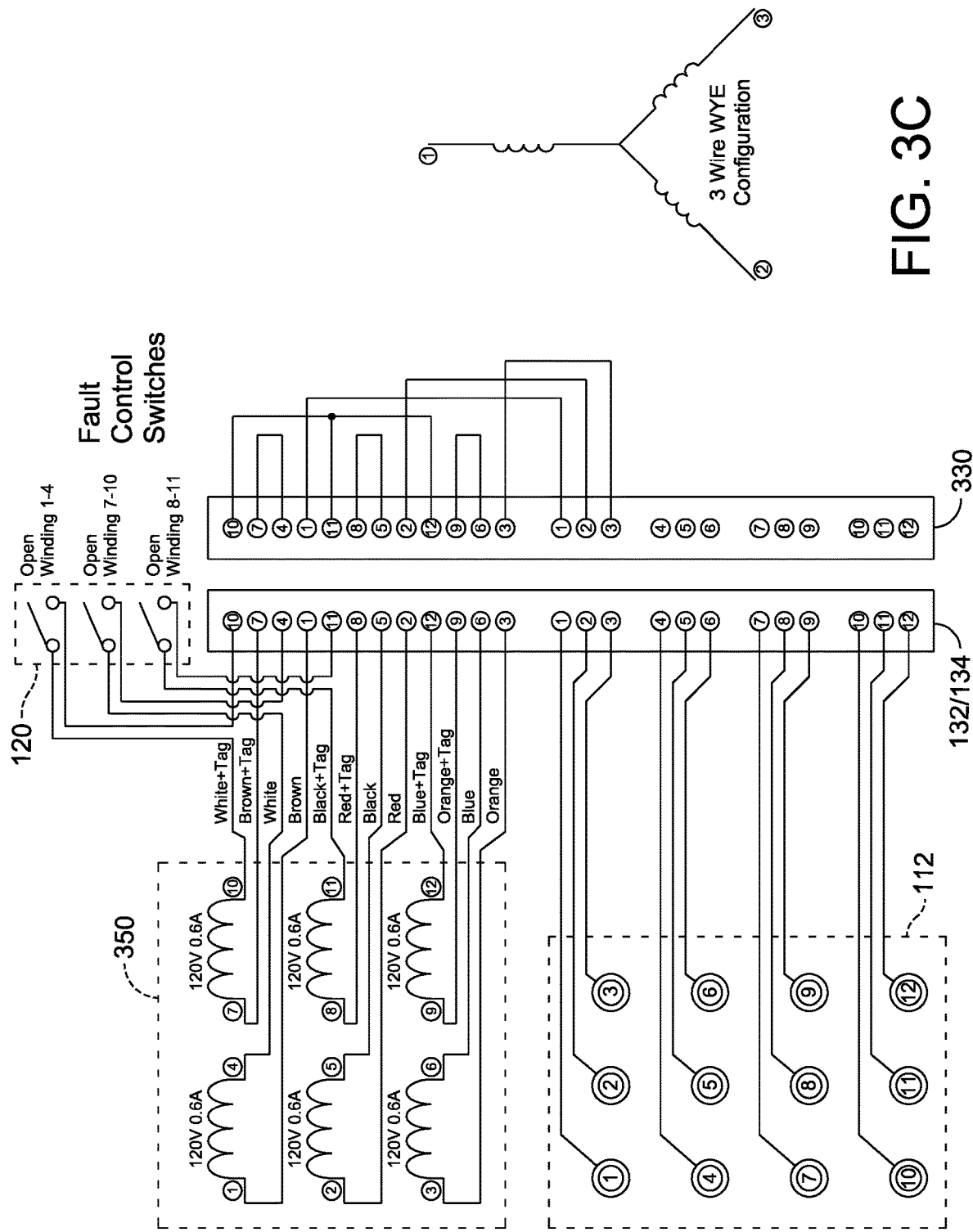
FIG. 3C is a schematic diagram illustrating the configuration for the 3-wire wye faceplate and cartridge arrangement, according to the present disclosure.

FIG. 3A is a perspective view of the 3-wire wye faceplate 310, and FIG. 3B is a perspective view of the 3-wire wye cartridge 330 that corresponds to the faceplate 310 of FIG. 3A, according to the present disclosure. The faceplate 310 is configured to be placed on the base 110 on the same manner as faceplate 162 in FIG. 2. The faceplate 310 is used to connect a 12-lead motor to the three leads identified by the openings 311, 312, and 313 which have adjacent numbers 1, 2, and 3, respectively, to identify which lead connections visible in the openings are to be connected to the 12-lead motor. The faceplate 310 includes small openings 323, 325 that engage, respectively, with the posts 113, 116 on the base 110. The cartridge 330 would be placed on the base 110 in the same manner as cartridge 164 in FIG. 2, to interface with the receptacle 132/134. The cartridge 330 includes a table 335 that provides important data for implementation of the particular configuration.

FIG. 3C is a schematic diagram illustrating the configuration for the 3-wire wye cartridge arrangement, according to the present disclosure. It should be clear in light of the present disclosure, the faceplate 310 is configured to cover the leads 112 that are not used during the configuration. The schematic in FIG. 3C illustrates the switches 120 as well as the open windings 350. The switches 120 correspond to the switches 120 on the base 110 to simulate faults as open windings. The open windings 350 in FIG. 3C correspond to, and may be the same as or substantially similar to, the open windings 142 of the motor portion 140 (see FIG. 1 and FIG. 2). Note that the cartridge 330 has the configuration as shown in FIG. 3C and the connectivity to the receptacle 132/134 changes the configuration of the motor windings 350 to be a 3-wire wye configuration.

Each faceplate can include a graphic illustrating the diagram that corresponds to the configuration for the faceplate and cartridge configuration. Each cartridge includes a table (e.g., table 335 in cartridge 330) that provides important data for implementation of the particular configuration (e.g., 3-wire wye in FIG. 3C, illustrating cartridge 330). Each cartridge has a diagram of the configuration (numbers and schematic) and the faceplate has just the numbers (the labels of the wires) graphically illustrated.

Note that the "receptacle" 132/134 is a 24-pin receptacle in this configuration having a first set of twelve pins in the upper portion (134) that are connected to the motor windings and a second set of twelve pins in the lower portion (132) that are connected to the lead connections 112. These 24 pins interface with the 24-pin cartridge 330. The cartridge 330 likewise has two sets of twelve pins (see FIG. 3C). The upper twelve pins of the cartridge 330 interface with the pins of the receptacle 134 that are connected to the motor windings, in order to appropriately configure the motor windings. The lower twelve pins interface with the lead connections that are utilized. For example, in FIG. 3C, only the top three leads are connected to by the cartridge 330.

The system allows for multiple faceplate and cartridge pairs to be used to change the configuration of the motor windings (350 in FIG. 3C or 142 in FIG. 1) so that multiple configurations of the AC motor can be achieved using a single set of motor windings with a plurality of interchangeable faceplates and cartridges. This provides a significant advantage for example in a teaching environment, because only a single motor and power supply can be used with the faceplate and cartridge pairs to emulate multiple AC motor configurations without having to provide multiple separate and individual AC motors. Note that motor windings 350 are a schematic illustration of the actual motor windings 142 shown in FIG. 1. The term "motor windings" as used herein can be used to describe either interchangeably unless otherwise noted.

Figure 4B:
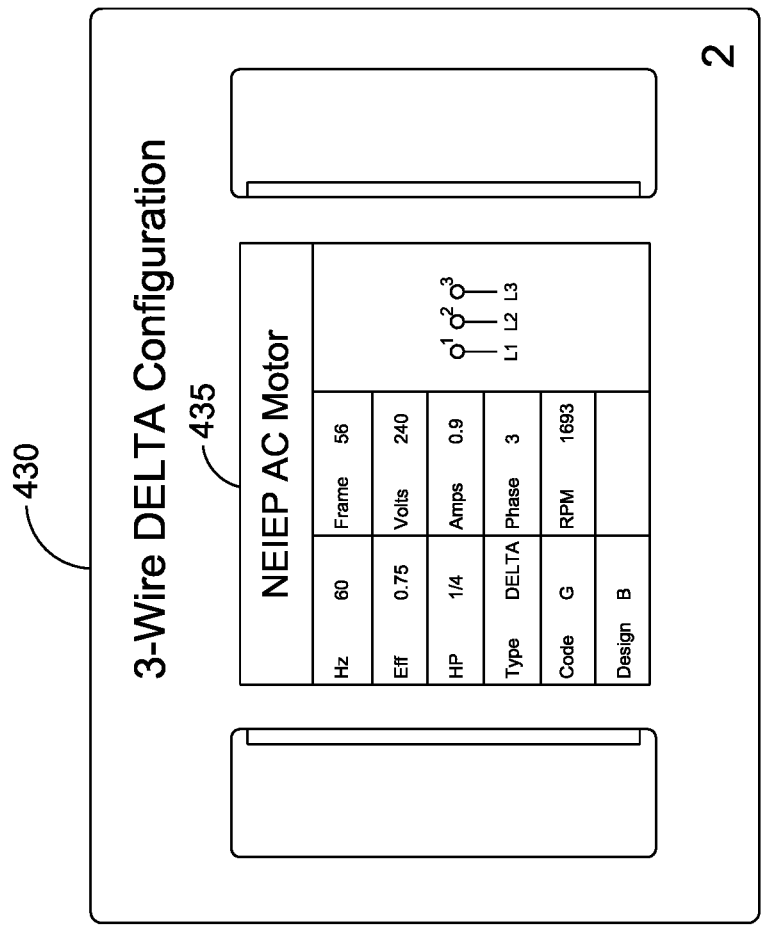
FIG. 4B is a perspective view of the 3-wire delta cartridge, that corresponds to the faceplate of FIG. 4A, according to the present disclosure.
Figure 4A:
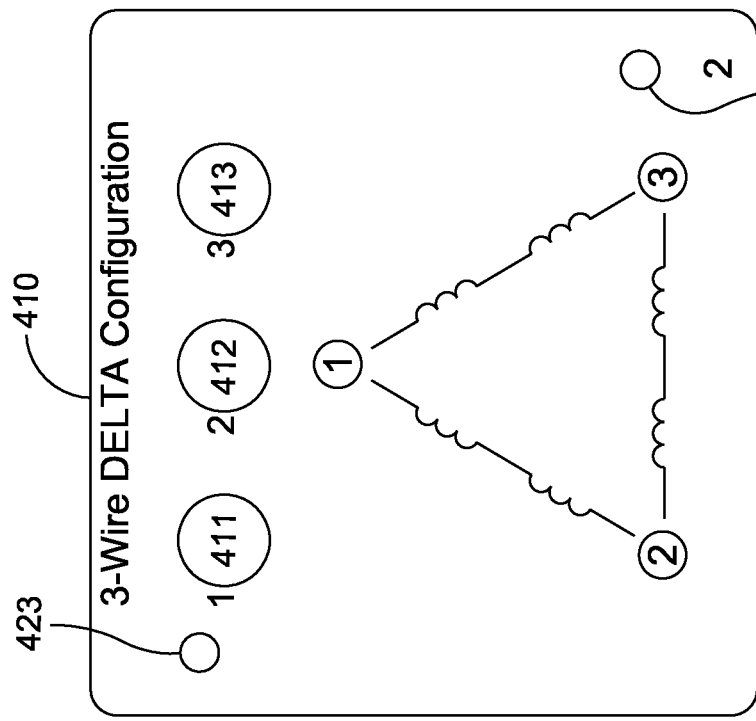
FIG. 4A is a perspective view of the 3-wire delta faceplate, according to the present disclosure.

FIG. 4A is a perspective view of the 3-wire delta faceplate 410, and FIG. 4B is a perspective view of the 3-wire delta cartridge 430 that corresponds to the faceplate 410 of FIG. 4A, according to the present disclosure. The faceplate 410 is configured to be placed on the base 110 on the same manner as faceplate 162 in FIG. 2. The faceplate 410 is used to connect a 12-lead motor to the three leads identified by the openings 411, 412, and 413 which have adjacent numbers 1, 2, and 3, respectively, to identify which lead connections visible in the openings are to be connected to the 12-lead motor. The faceplate 410 includes small openings 423, 425 that engage, respectively, with the posts 113, 116 on the base 110. The cartridge 430 would be placed on the base 110 in the same manner as cartridge 164 in FIG. 2, to interface with the receptacle 132/134. The cartridge 430 includes a table 435 that provides important data for implementation of the particular configuration.

Figure 4C:
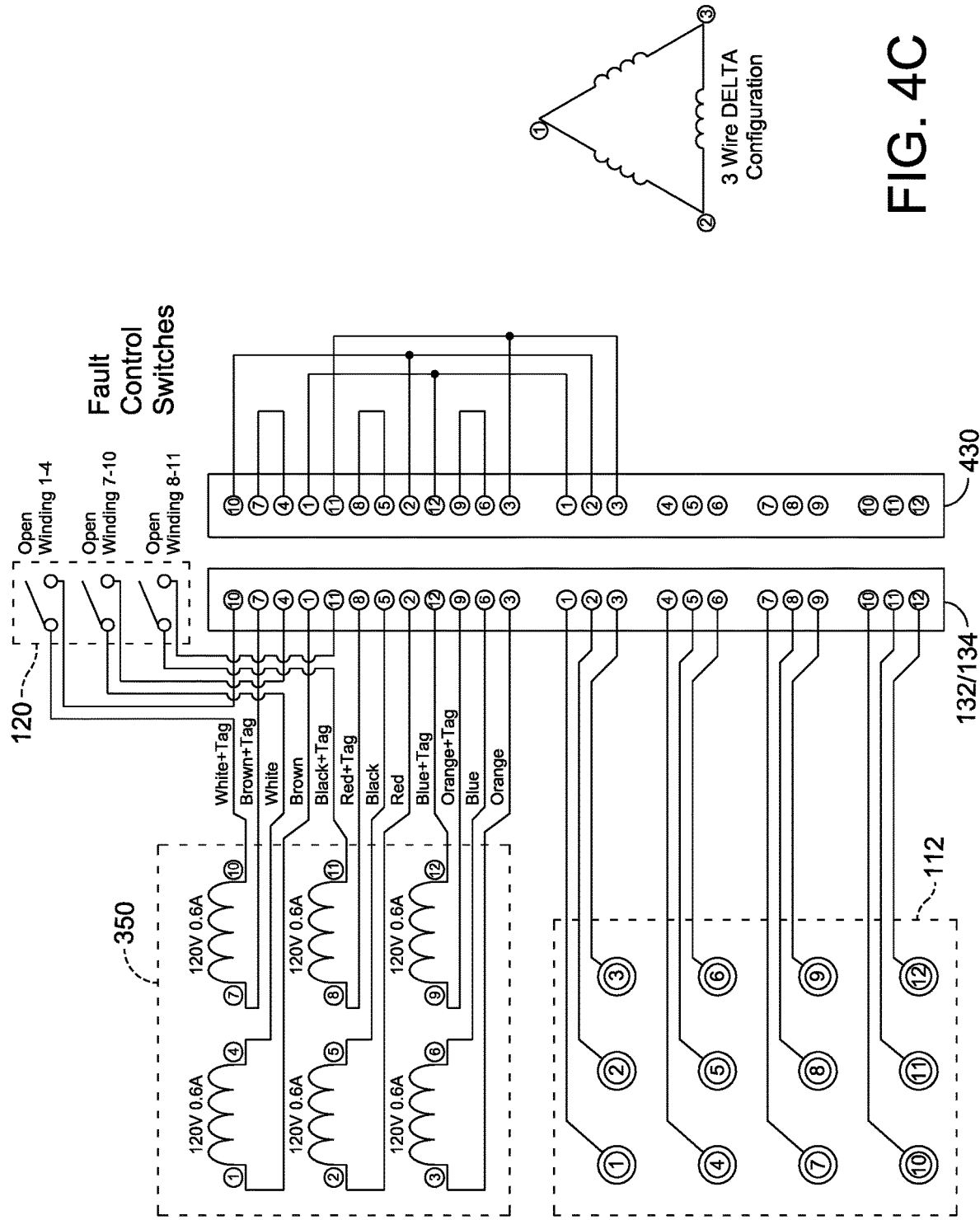
FIG. 4C is a schematic diagram illustrating the configuration for the 3-wire delta faceplate and cartridge arrangement, according to the present disclosure.

FIG. 4C is a schematic diagram illustrating the configuration for the 3-wire delta faceplate and cartridge arrangement, according to the present disclosure. It should be clear in light of the present disclosure, the faceplate 410 is configured to cover the leads 112 that are not used during the configuration. The schematic in FIG. 4C illustrates the switches 120, as well as the open windings 350. The switches 120 simulate faults as open windings and may correspond to the switches 120 on the base 110. The open windings 350 in FIG. 4C correspond to, and may be the same as or substantially similar to, the open windings 142 of the motor portion 140 (see FIG. 1 and FIG. 2). Note that the cartridge 430 has the configuration as shown in FIG. 3C and the connectivity to the receptacle 132/134 changes the configuration of the motor windings 350 to be a 3-wire delta configuration.

Figure 5B:
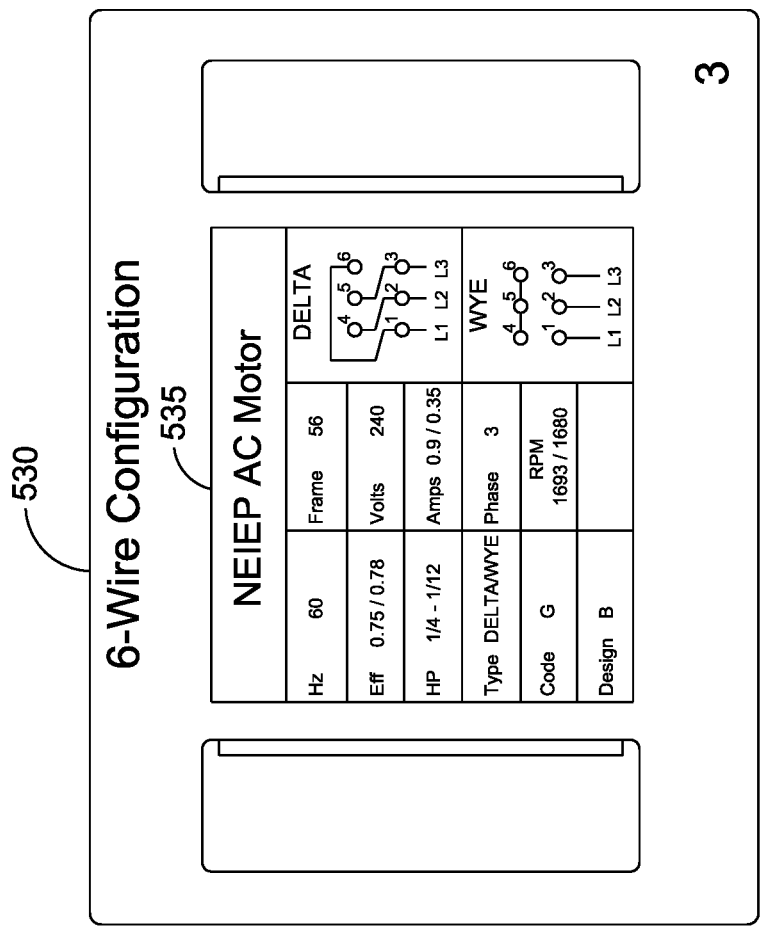
FIG. 5B is a perspective view of the 6-wire cartridge, that corresponds to the faceplate of FIG. 5A, according to the present disclosure.
Figure 5A:
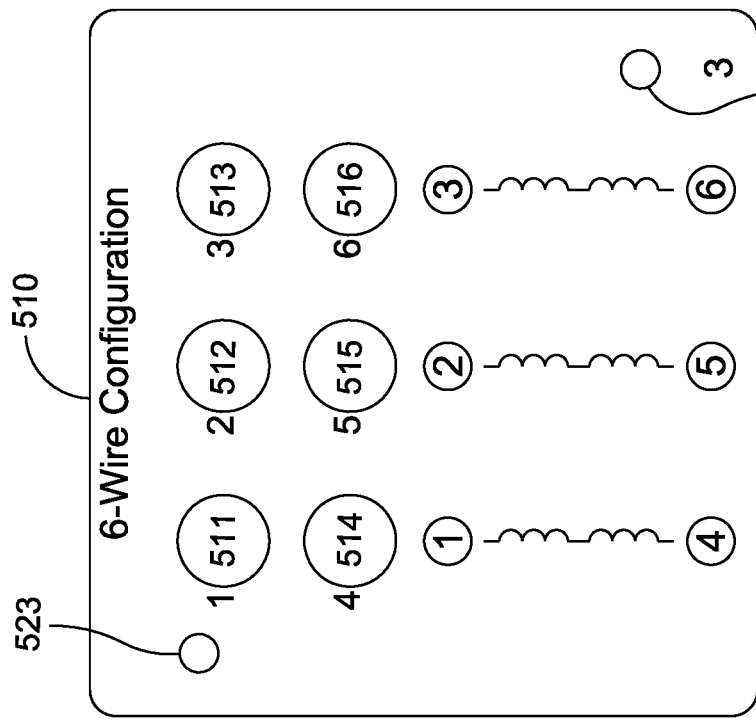
FIG. 5A is a perspective view of the 6-wire faceplate, according to the present disclosure.

FIG. 5A is a perspective view of the 6-wire faceplate 510, and FIG. 5B is a perspective view of the 6-wire cartridge 530 that corresponds to the faceplate of FIG. 5A, according to the present disclosure. The faceplate 510 is configured to be placed on the base 110 on the same manner as faceplate 162 in FIG. 2. The faceplate 510 is used to connect a 12-lead motor to the six leads identified by the openings 511, 512, 513, 514, 515, and 516 which have adjacent numbers 1, 2, 3, 4, 5, and 6, respectively, to identify which lead connections visible in the openings are to be connected to the corresponding lead of a 12-lead motor. The faceplate 510 includes small openings 523, 525 that engage, respectively, with the posts 113, 116 on the base. The cartridge 530 would be placed on the base 110 in the same manner as cartridge 164 in FIG. 2, to interface with the receptacle 132/134. The cartridge 530 includes a table 535 that provides important data for implementation of the particular configuration.

Figure 5C:
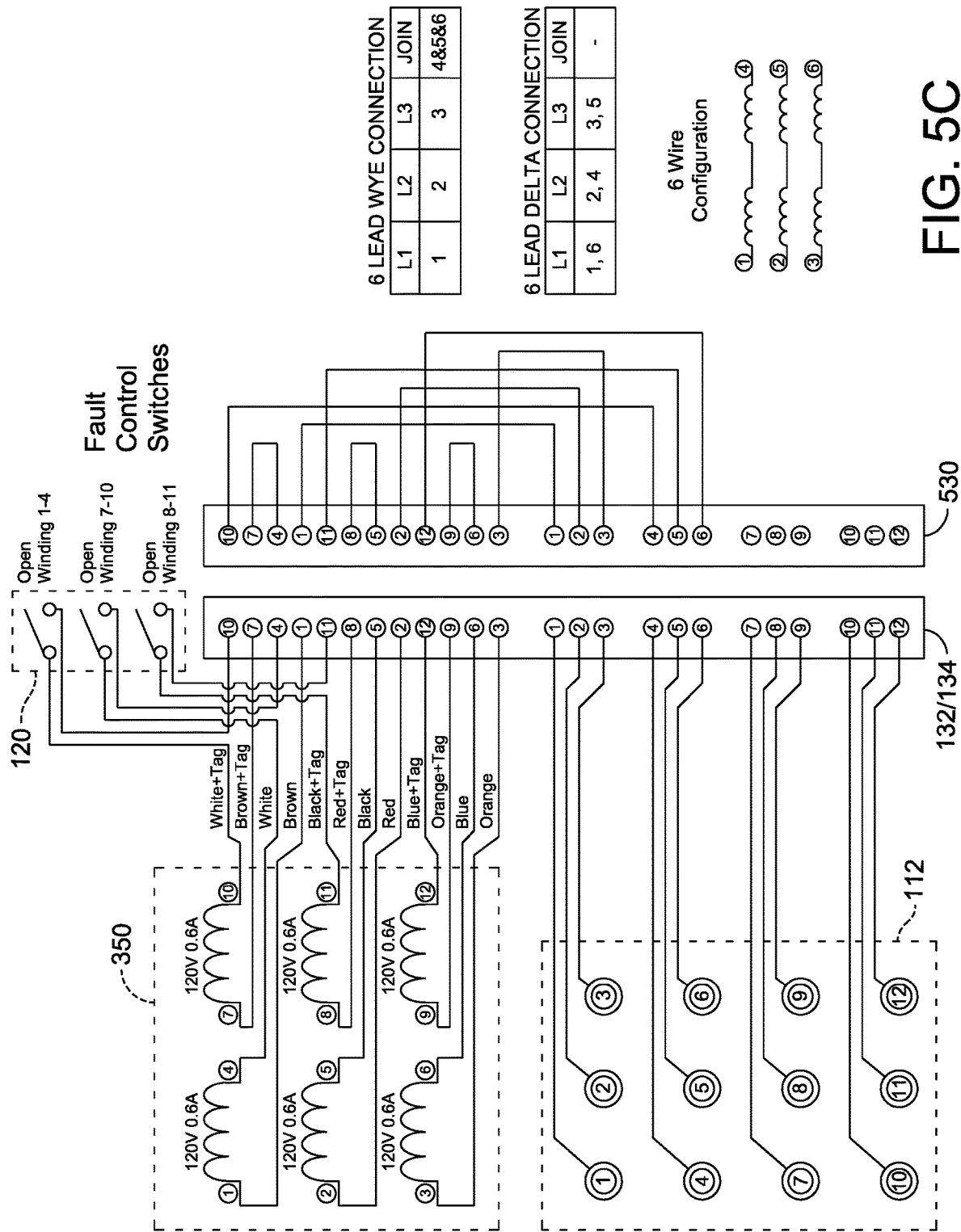
FIG. 5C is a schematic diagram illustrating the configuration for the 6-wire faceplate and cartridge arrangement, according to the present disclosure.

FIG. 5C is a schematic diagram illustrating the configuration for the 6-wire faceplate and cartridge arrangement, according to the present disclosure. It should be clear in light of the present disclosure, the faceplate 510 is configured to cover the leads 112 that are not used during the configuration. The schematic in FIG. 5C illustrates the switches 120 as well as the open windings 350. The switches 120 correspond to switches on base 110 and are configured to simulate faults as open windings. The open windings 350 in FIG. 5C correspond to, and may be the same as or substantially similar to, the open windings 142 of the motor portion 140 (see FIG. 1 and FIG. 2). Note that the cartridge 530 has the configuration as shown in FIG. 5C and the connectivity to the receptacle 132/134 changes the configuration of the motor windings 350 to be a 6-wire configuration.

Figure 6B:
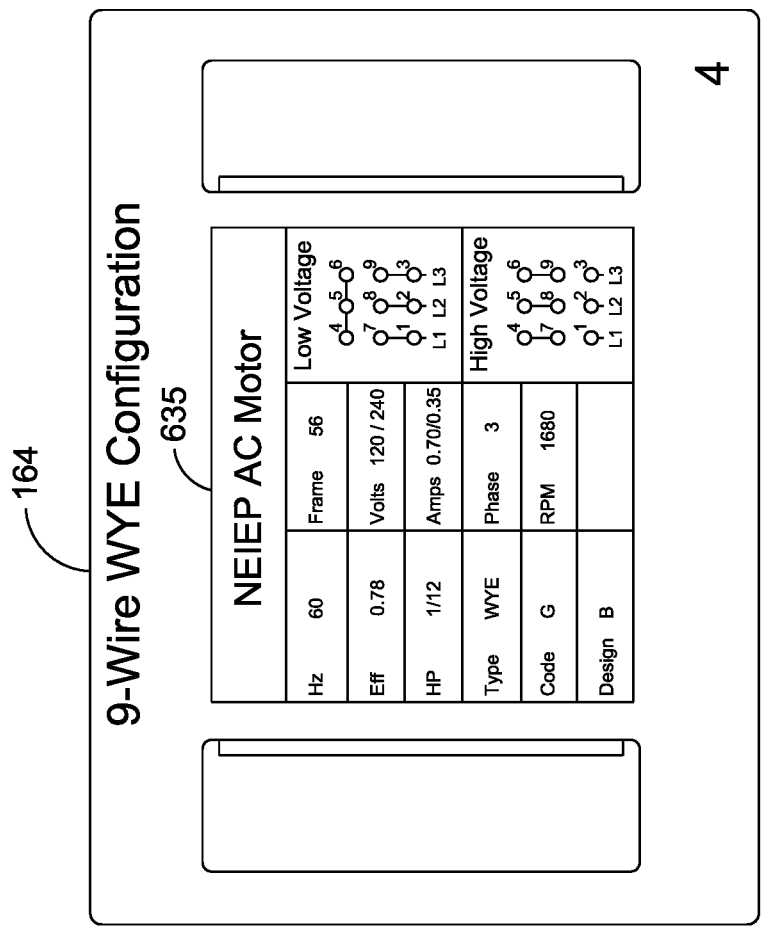
FIG. 6B is a perspective view of the 9-wire wye cartridge, that corresponds to the faceplate of FIG. 6A, according to the present disclosure.
Figure 6A:
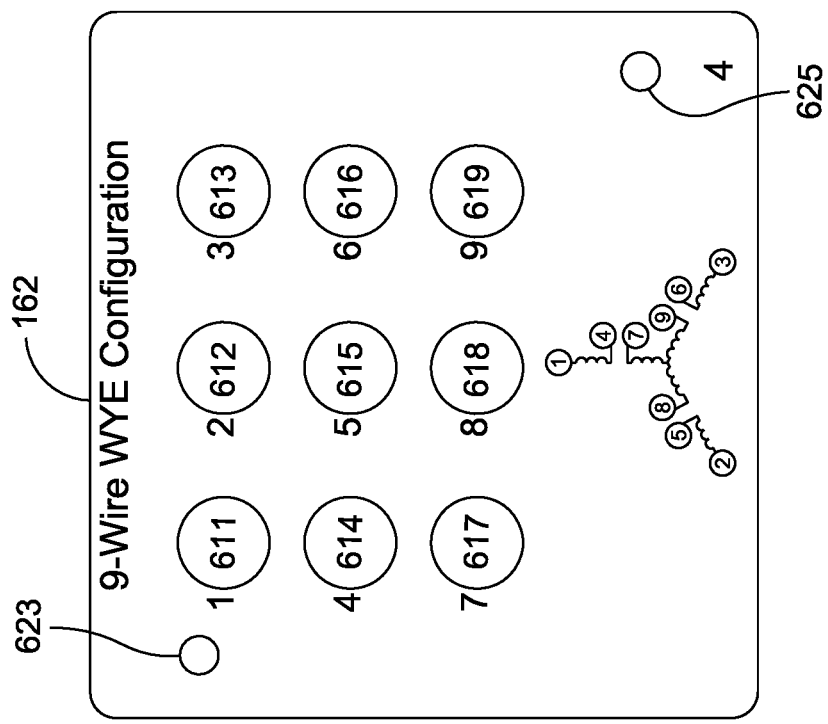
FIG. 6A is a perspective view of the 9-wire wye faceplate, according to the present disclosure.

FIG. 6A is a perspective view of the 9-wire wye faceplate 162, and FIG. 6B is a perspective view of the 9-wire wye cartridge 164 that corresponds to the faceplate 162 of FIG. 6A, according to the present disclosure. The faceplate 162 is configured to be placed on the base 110 as shown in FIG. 2. The faceplate 162 is used to connect a 12-lead motor to the nine leads identified by the openings 611, 612, 613, 614, 615, 616, 617, 618, and 619, which have adjacent numbers 1, 2, 3, 4, 5, 6, 7, 8, and 9, respectively, to identify which lead connections visible in the openings are to be connected to the 12-lead motor. The faceplate 162 includes small openings 623, 625 that engage, respectively, with the posts 113, 116 on the base 110. The cartridge 164 would be placed on the base 110 in the manner as shown in FIG. 2, to interface with the receptacle 132/134. The cartridge 164 includes a table 635 that provides important data for implementation of the particular configuration.

Figure 6C:
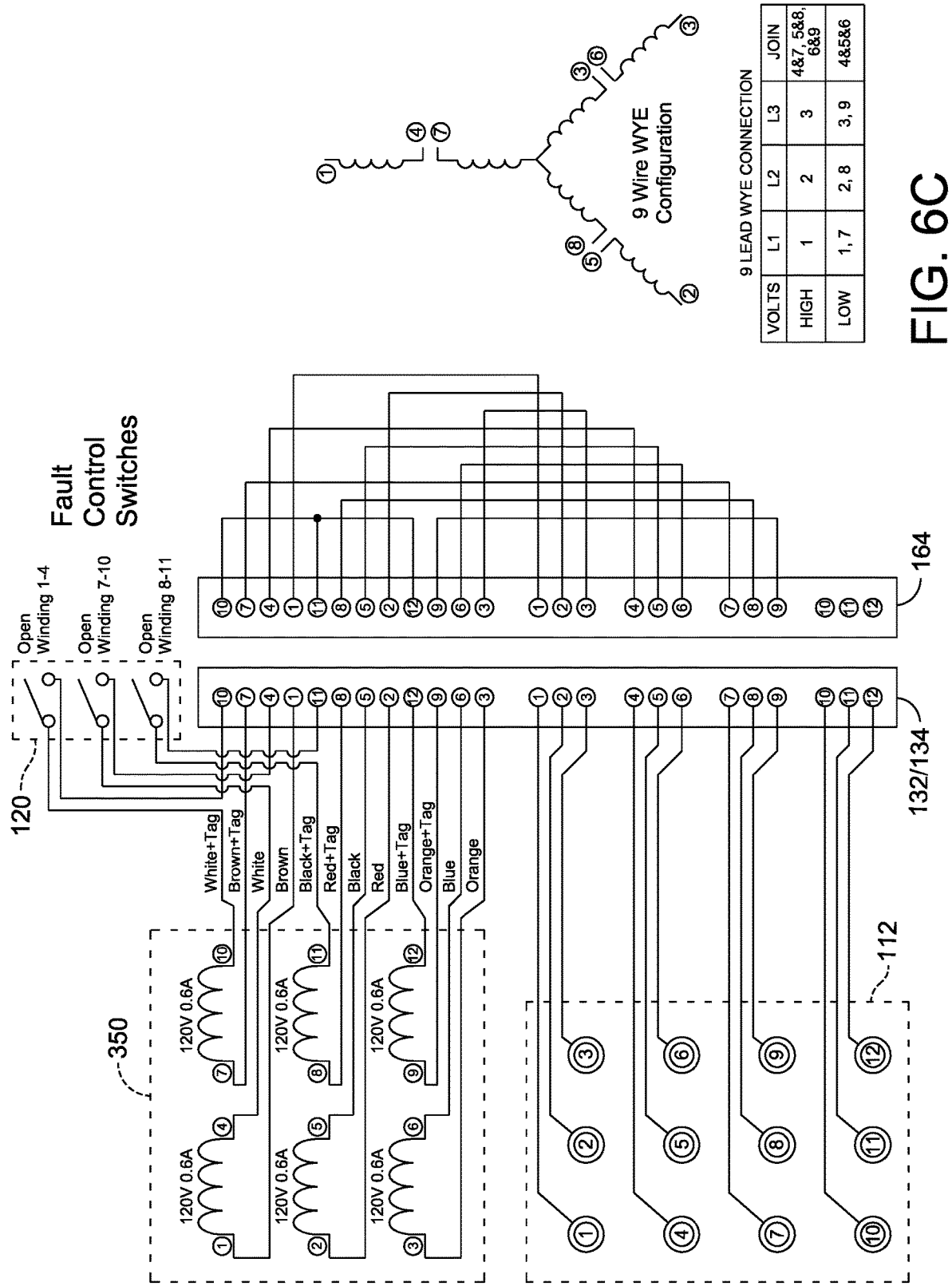
FIG. 6C is a schematic diagram illustrating the configuration for the 9-wire wye faceplate and cartridge arrangement, according to the present disclosure.

FIG. 6C is a schematic diagram illustrating the configuration for the 9-wire wye faceplate and cartridge arrangement, according to the present disclosure. It should be clear in light of the present disclosure, the faceplate 162 is configured to cover the leads 112 that are not used during the configuration. The schematic in FIG. 6C illustrates the switches 120 as well as the open windings 350. The switches 120 correspond to the switches on the base 110 and also simulate faults as open windings. The open windings 350 in FIG. 6C correspond to, and may be the same as or substantially similar to, the open windings 142 of the motor portion 140 (see FIG. 1 and FIG. 2). Note that the cartridge 164 has the configuration as shown in FIG. 6C and the connectivity to the receptacle 132/134 changes the configuration of the motor windings 350 to be a 9-wire wye configuration.

FIG. 7A is a perspective view of the 9-wire delta faceplate 710, and FIG. 7B is a perspective view of the 9-wire delta cartridge 730 that corresponds to the faceplate of FIG. 7A, according to the present disclosure. The faceplate 710 is configured to be placed on the base 110 on the same manner as faceplate 162 in FIG. 2. The faceplate 710 is used to connect a 12-lead motor to the nine leads identified by the openings 711, 712, 713, 714, 715, 716, 717, 718, and 719, which have adjacent numbers 1, 2, 3, 4, 5, 6, 7, 8, and 9, respectively, to identify which lead connections visible in the openings are to be connected to the 12-lead motor. The faceplate 710 includes small openings 723, 725 that engage, respectively, with the posts 113, 116 on the base 110. The cartridge 730 would be placed on the base 110 in the same manner as cartridge 164 in FIG. 2, to interface with the receptacle 132/134. The cartridge 730 includes a table 735 that provides important data for implementation of the particular configuration.

Figure 7C:
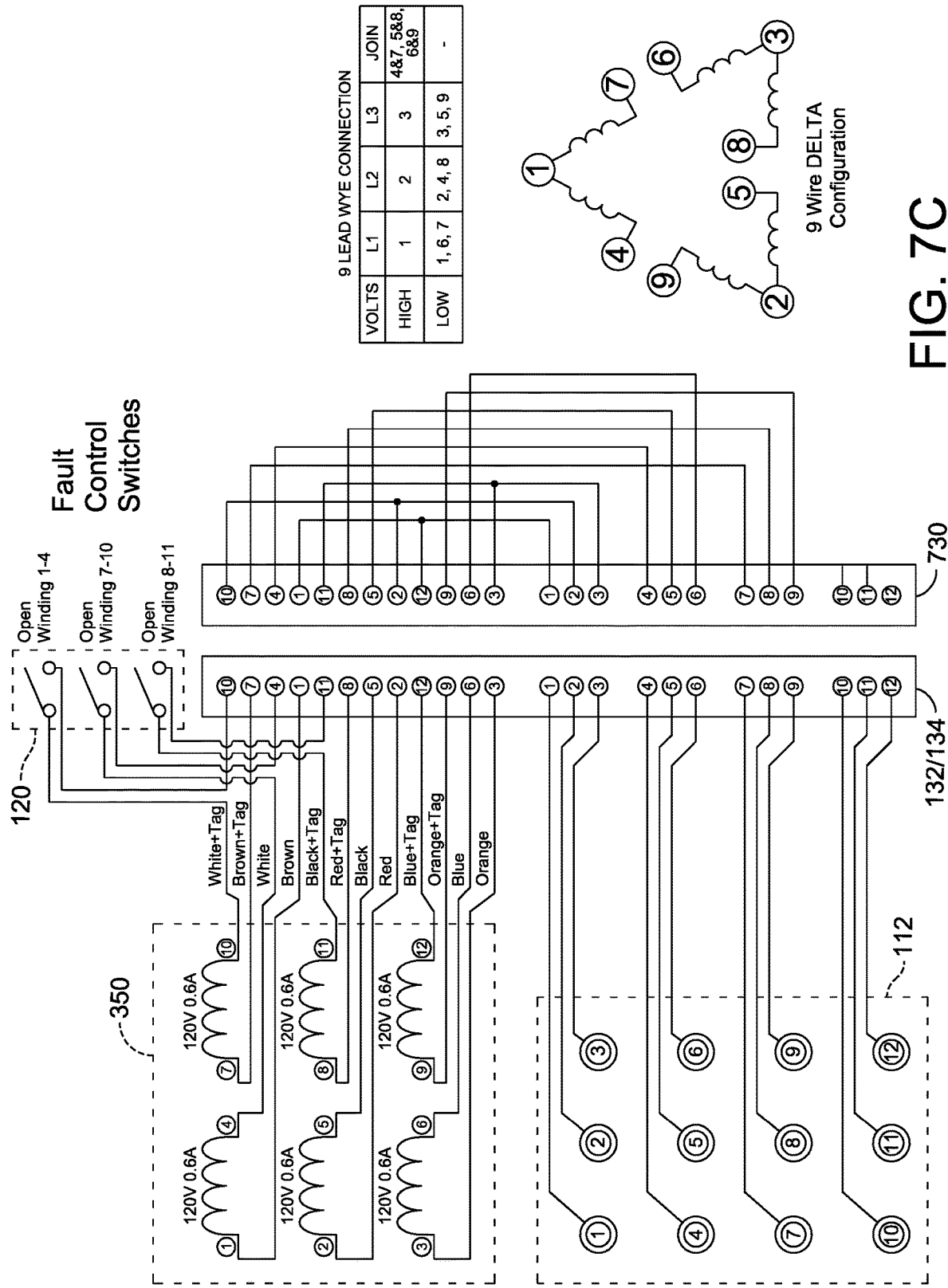
FIG. 7C is a schematic diagram illustrating the configuration for the 9-wire delta faceplate and cartridge arrangement, according to the present disclosure.

FIG. 7C is a schematic diagram illustrating the configuration for the 9-wire delta faceplate and cartridge arrangement, according to the present disclosure. It should be clear in light of the present disclosure, the faceplate 710 is configured to cover the leads 112 that are not used during the configuration. The schematic in FIG. 7C illustrates the switches 120 and the open windings 350. The switches 120 correspond to the switches on the base 110 and also simulate faults as open windings. The open windings 350 in FIG. 7C correspond to, and may be the same as or substantially similar to, the open windings 142 of the motor portion 140 (see FIG. 1 and FIG. 2). Note that the cartridge 730 has the configuration as shown in FIG. 7C and the connectivity to the receptacle 132/134 changes the configuration of the motor windings 350 to be a 9-wire delta configuration.

Figure 8B:
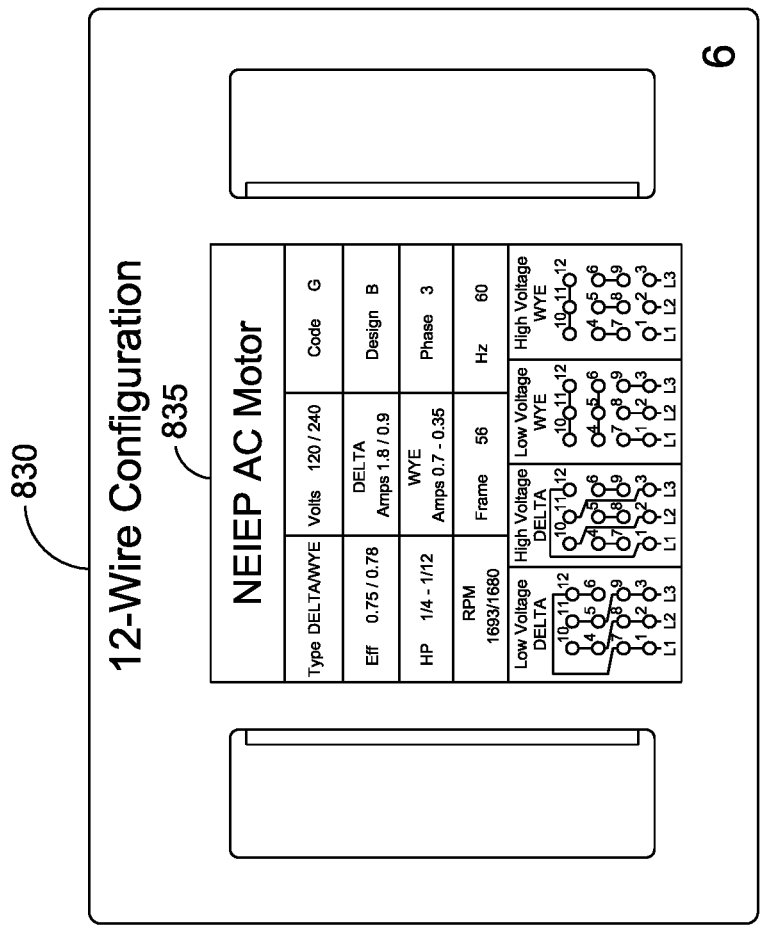
FIG. 8B is a perspective view of the 12-wire cartridge, that corresponds to the faceplate of FIG. 8A, according to the present disclosure.
Figure 8A:
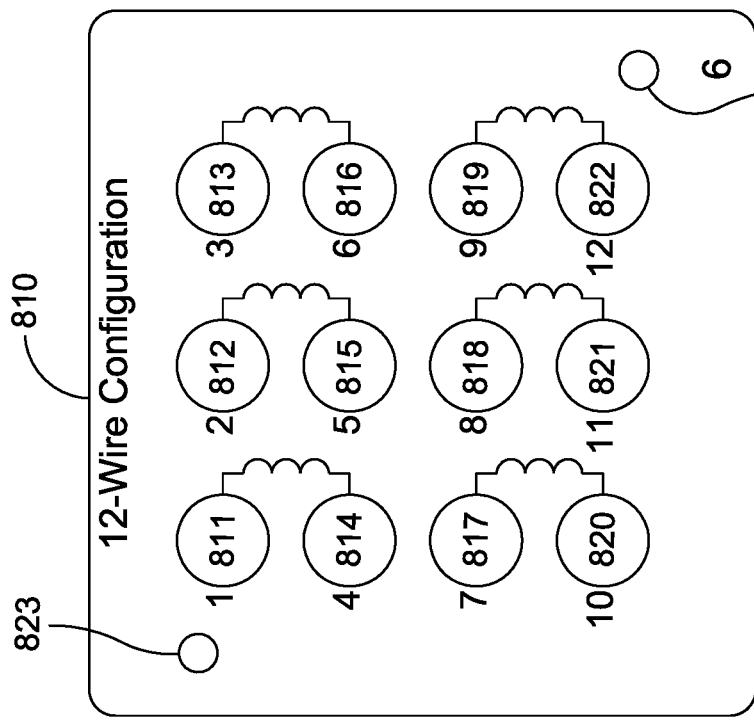
FIG. 8A is a perspective view of the 12-wire faceplate, according to the present disclosure.

FIG. 8A is a perspective view of the 12-wire faceplate 810, and FIG. 8B is a perspective view of the 12-wire cartridge 830 that corresponds to the faceplate 810 of FIG. 8A, according to the present disclosure. The faceplate 810 is configured to be placed on the base 110 on the same manner as faceplate 162 in FIG. 2. The faceplate 810 is used to connect a 12-lead motor to the twelve leads identified by the openings 811, 812, 813, 814, 815, 816, 817, 818, 819, 820, 821, and 822 which have adjacent numbers 1-12, respectively, to identify which lead connections visible in the openings are to be connected to the 12-lead motor. The faceplate 810 includes small openings 823, 825 that engage, respectively, with the posts 113, 116 on the base 110. The cartridge 830 would be placed on the base 110 in the same manner as cartridge 164 in FIG. 2, to interface with the receptacle 132/134. The cartridge 830 includes a table 835 that provides important data for implementation of the particular configuration.

Figure 8C:
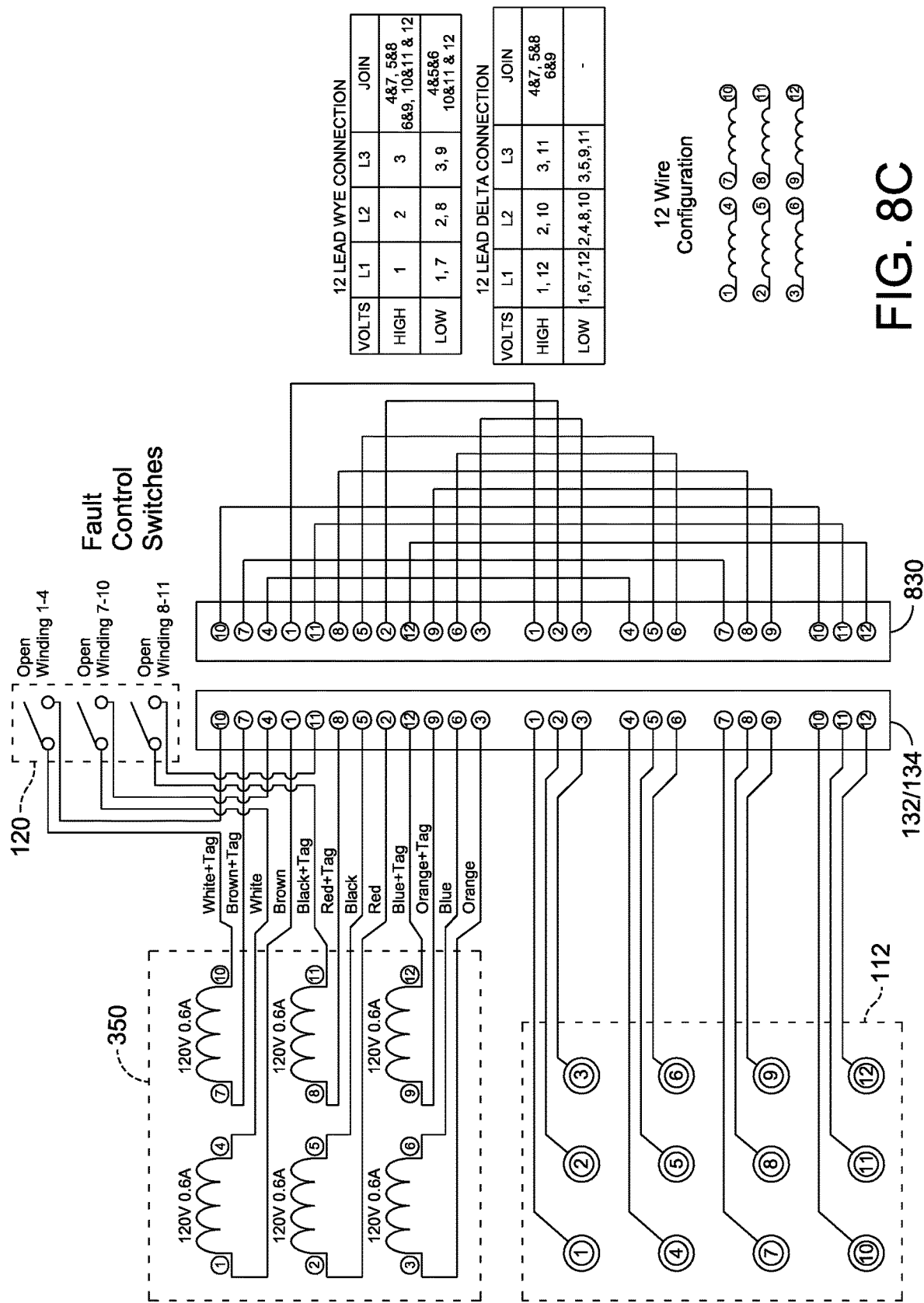
FIG. 8C is a schematic diagram illustrating the configuration for the 12-wire faceplate and cartridge arrangement, according to the present disclosure.

FIG. 8C is a schematic diagram illustrating the configuration for the 12-wire faceplate and cartridge arrangement, according to the present disclosure. It should be clear in light of the present disclosure, the faceplate 810 is configured to cover the leads 112 that are not used during the configuration. The schematic in FIG. 8C illustrates the switches 120 as well as the open windings 350. The switches 120 correspond to the switches on n the base 110 and also simulate faults as open windings. The open windings 350 in FIG. 8C correspond to, and may be the same as or substantially similar to, the open windings 142 of the motor portion 140 (see FIG. 1 and FIG. 2). Note that the cartridge 830 has the configuration as shown in FIG. 8C and the connectivity to the receptacle 132/134 changes the configuration of the motor windings 350 to be a 12-wire configuration.

Figure 9B:
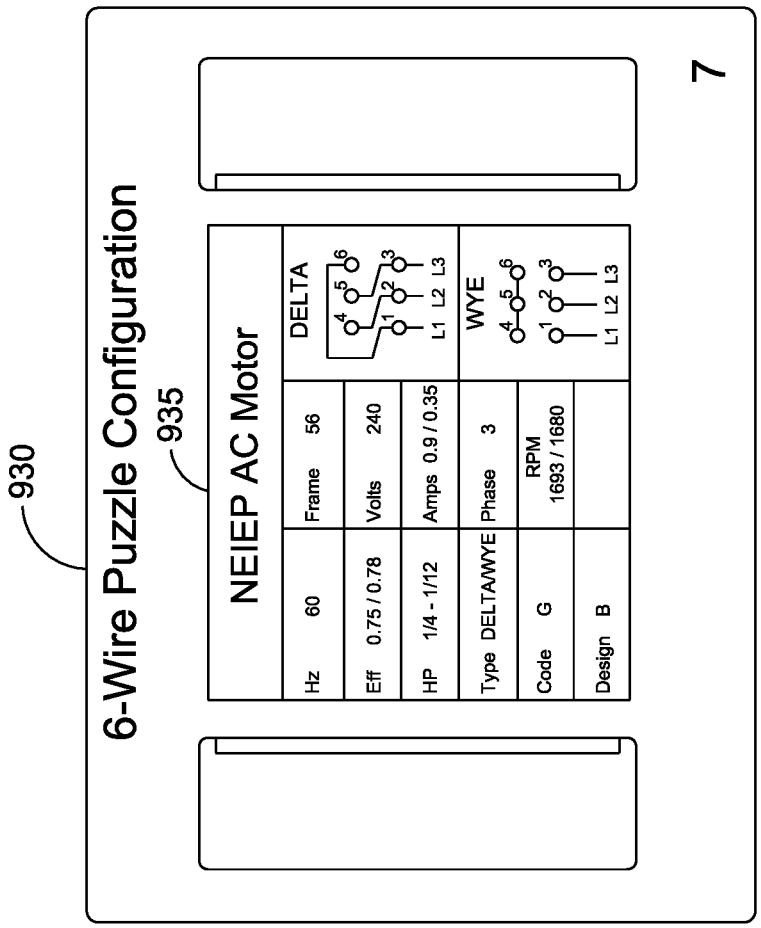
FIG. 9B is a perspective view of the 6-wire puzzle cartridge, that corresponds to the faceplate of FIG. 9A, according to the present disclosure.
Figure 9A:
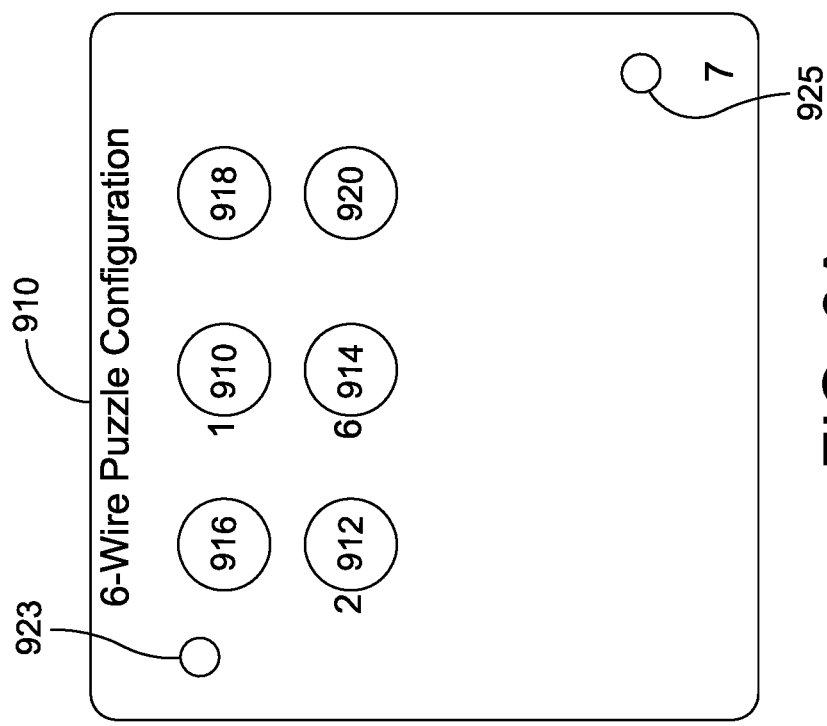
FIG. 9A is a perspective view of the 6-wire puzzle faceplate, according to the present disclosure.

FIG. 9A is a perspective view of the 6-wire puzzle faceplate 910, and FIG. 9B is a perspective view of the 6-wire puzzle cartridge 930 that corresponds to the faceplate 910 of FIG. 9A to form the 6-wire puzzle faceplate and cartridge pair, according to the present disclosure. For the puzzle configurations, a user (such as a student) utilizes a meter to determine what the non-numbered openings are (in other words, which lead numbers should be utilized for the non-numbered openings) based on the meter readings obtained.

The faceplate 910 of FIG. 9A is configured to be placed on the base 110 on the same manner as faceplate 162 in FIG. 2. The faceplate 910 is used to connect a 12-lead motor to the six leads identified by the openings 910, 912, 914, 916, 918, and 920. Note that openings 910, 912, and 914, have adjacent numbers 1, 2, and 6, to indicate which lead connections visible through the openings should be connected to those corresponding lead connections. Whereas openings 916, 918, and 920 do not provide a lead number, and thus the meter is used to determine which leads should be connected to the lead connection corresponding to each opening. The faceplate 910 includes small openings 923, 925 that engage, respectively, with the posts 113, 116 on the base 110. The cartridge 930 would be placed on the base 110 in the same manner as cartridge 164 in FIG. 2, to interface with the receptacle 132/134. The cartridge 930 includes a table 935 that provides important data for implementation of the particular configuration.

Figure 9C:
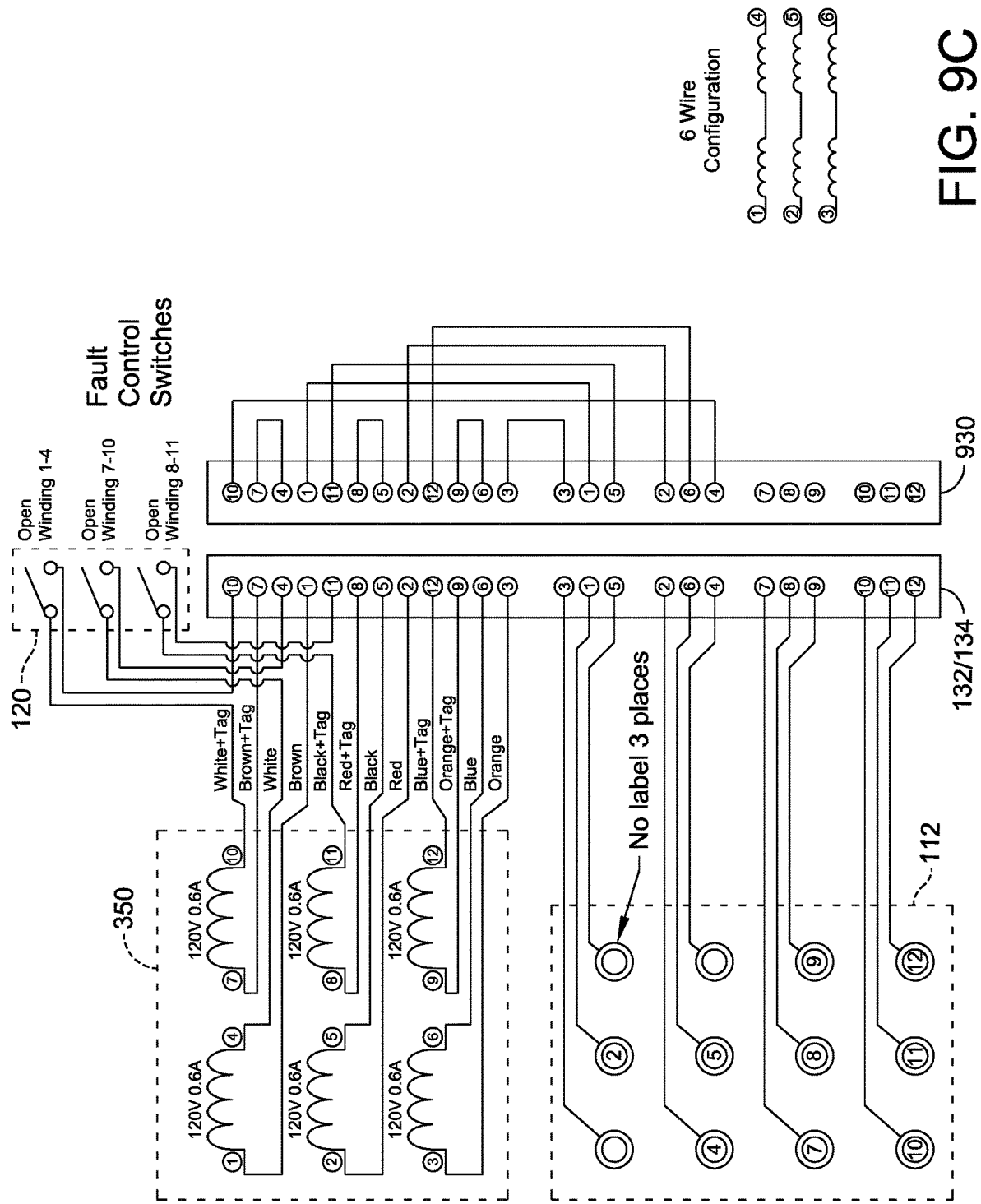
FIG. 9C is a schematic diagram illustrating the configuration for the 6-wire puzzle faceplate and cartridge arrangement, according to the present disclosure.

FIG. 9C is a schematic diagram illustrating the configuration for the 6-wire puzzle faceplate and cartridge arrangement, according to the present disclosure. It should be clear in light of the present disclosure, the faceplate 910 is configured to cover the leads 112 that are not used during the configuration. The schematic in FIG. 9C illustrates the switches 120 as well as the open windings 350. The switches 120 correspond to the switches on the base 110 and also simulate faults as open windings. The open windings 350 in FIG. 9C correspond to, and may be the same as or substantially similar to, the open windings 142 of the motor portion 140 (see FIG. 1 and FIG. 2). Note that the cartridge 930 has the configuration as shown in FIG. 9C and the connectivity to the receptacle 132/134 changes the configuration of the motor windings 350 to be a 6-wire puzzle configuration in which a user must determine where to appropriately connect the leads of the power supply.

Figure 10B:
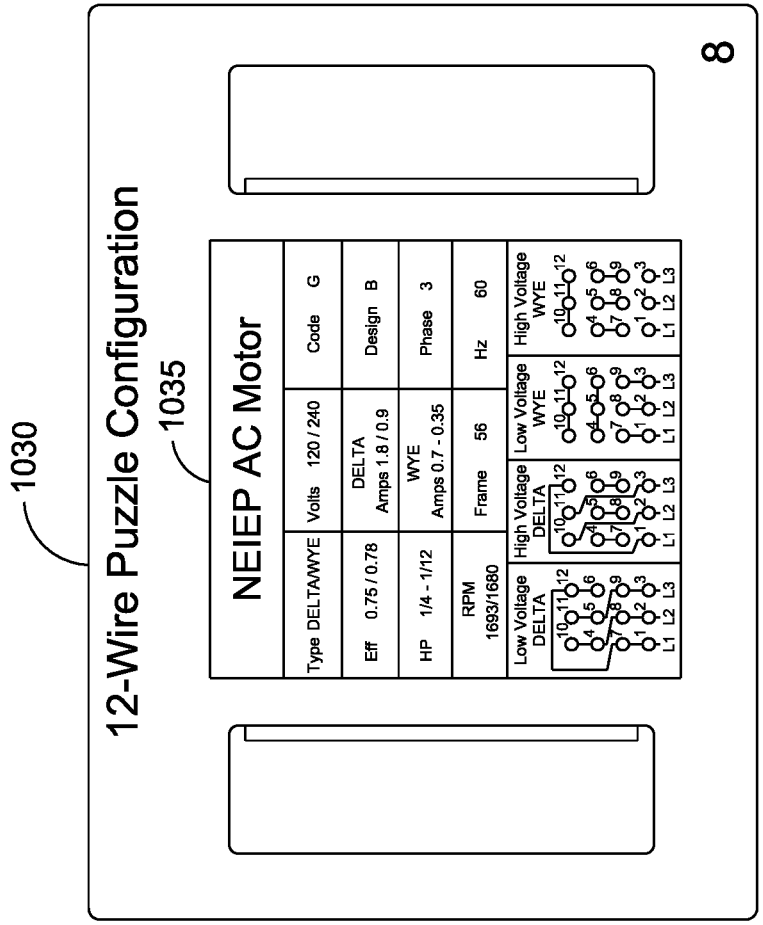
FIG. 10B is a perspective view of the 12-wire puzzle cartridge, that corresponds to the faceplate of FIG. 10A, according to the present disclosure.
Figure 10A:
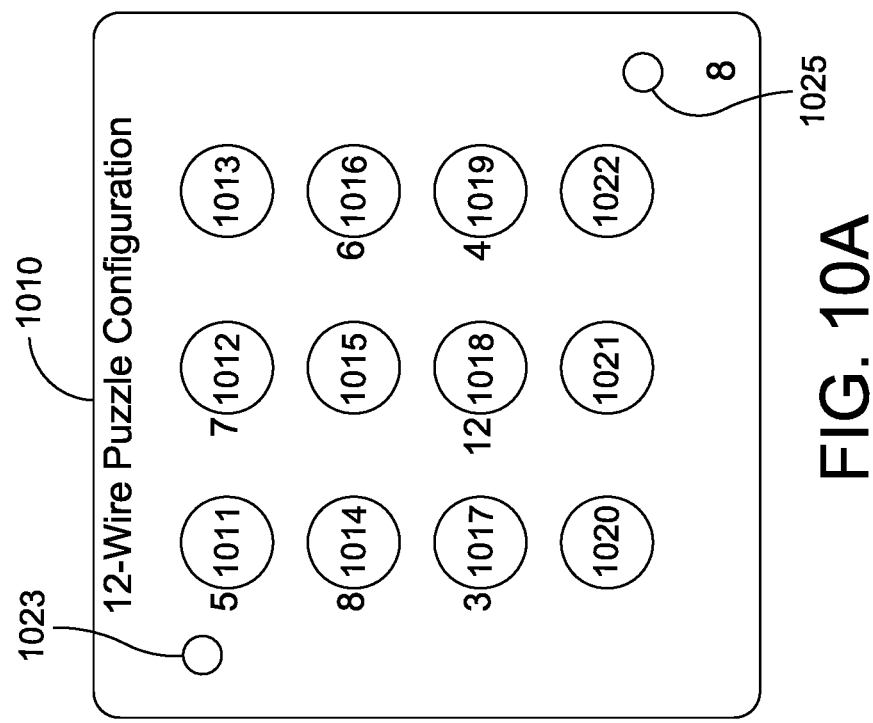
FIG. 10A is a perspective view of the 12-wire puzzle faceplate, according to the present disclosure.

FIG. 10A is a perspective view of the 12-wire puzzle faceplate 1010, and FIG. 10B is a perspective view of the 12-wire puzzle cartridge 1030 that corresponds to the faceplate 1010 of FIG. 10A, according to the present disclosure. The faceplate 1010 is configured to be placed on the base 110 on the same manner as faceplate 162 in FIG. 2. The faceplate 1010 is used to connect a 12-lead motor to the lead connections (112a-1121) identified by the openings 1011, 1012, 1013, 1014, 1015, 1016, 1017, 1018, 1019, 1020, 1021, and 1022. In this 12-wire puzzle configuration, seven openings are provided with adjacent lead numbers and the student must determine which leads of the power supply are connected to the remaining openings that are not provided with lead numbers. In this example, opening 1011 has adjacent lead number 5, opening 1012 has adjacent lead number 7, opening 1014 has adjacent lead number 8, opening 1016 has adjacent lead number 6, opening 1017 has adjacent lead number 3, opening 1018 has adjacent lead number 12, and opening 1019 has adjacent lead number 4. The openings 1013, 1015, 1020, 1021, and 1022 do not have lead numbers assigned, and thus the student uses the meter to plug and play with the other lead connections to determine the appropriate connectivity for the power supply to achieve the desired outcome.

The faceplate 1010 includes small openings 1023, 1025 that engage, respectively, with the posts 113, 116 on the base 110. The cartridge 1030 would be placed on the base 110 in the same manner as cartridge 164 in FIG. 2, to interface with the receptacle 132/134. The cartridge 1030 includes a table 1035 that provides important data for implementation of the particular configuration.

Figure 10C:
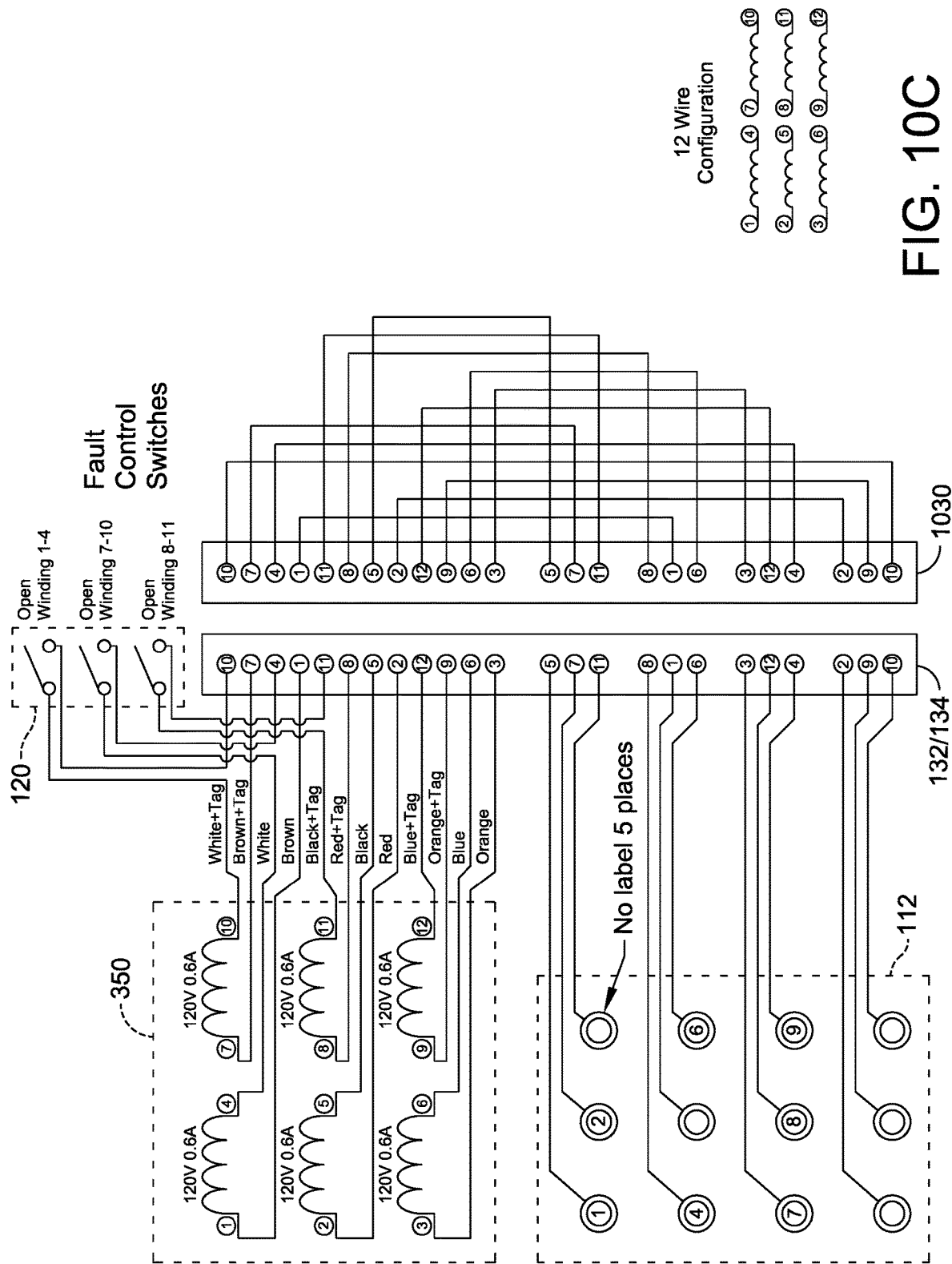
FIG. 10C is a schematic diagram illustrating the configuration for the 12-wire puzzle faceplate and cartridge arrangement, according to the present disclosure.

FIG. 10C is a schematic diagram illustrating the configuration for the 12-wire puzzle faceplate and cartridge arrangement, according to the present disclosure. It should be clear in light of the present disclosure, the faceplate 1010 is configured to cover the leads 112 that are not used during the configuration. The schematic in FIG. 10C illustrates the switches 120 as well as the open windings 350. The switches 120 correspond to the switches on the base 110 and also simulate faults as open windings. The open windings 350 in FIG. 10C correspond to, and may be the same as or substantially similar to, the open windings 142 of the motor portion 140 (see FIG. 1 and FIG. 2). Note that the cartridge 1030 has the configuration as shown in FIG. 3C and the connectivity to the receptacle 132/134 changes the configuration of the motor windings 350 to be a 12-wire puzzle configuration.

Figure 11B:
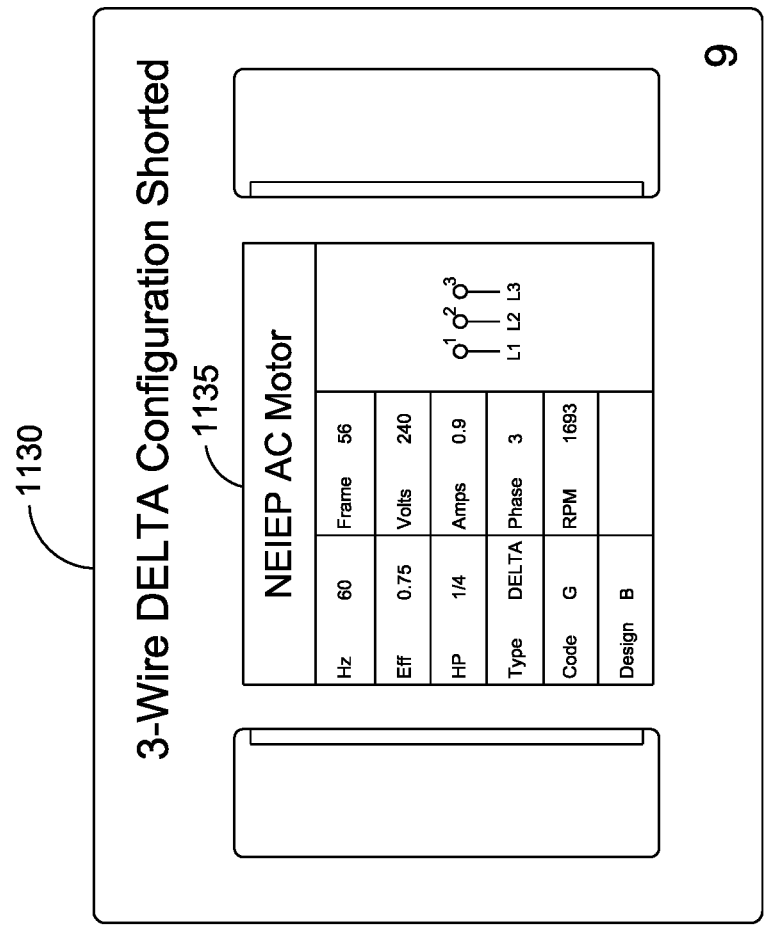
FIG. 11B is a perspective view of the 3-wire delta Configuration Shorted cartridge, that corresponds to the faceplate of FIG. 11A, according to the present disclosure.
Figure 11A:
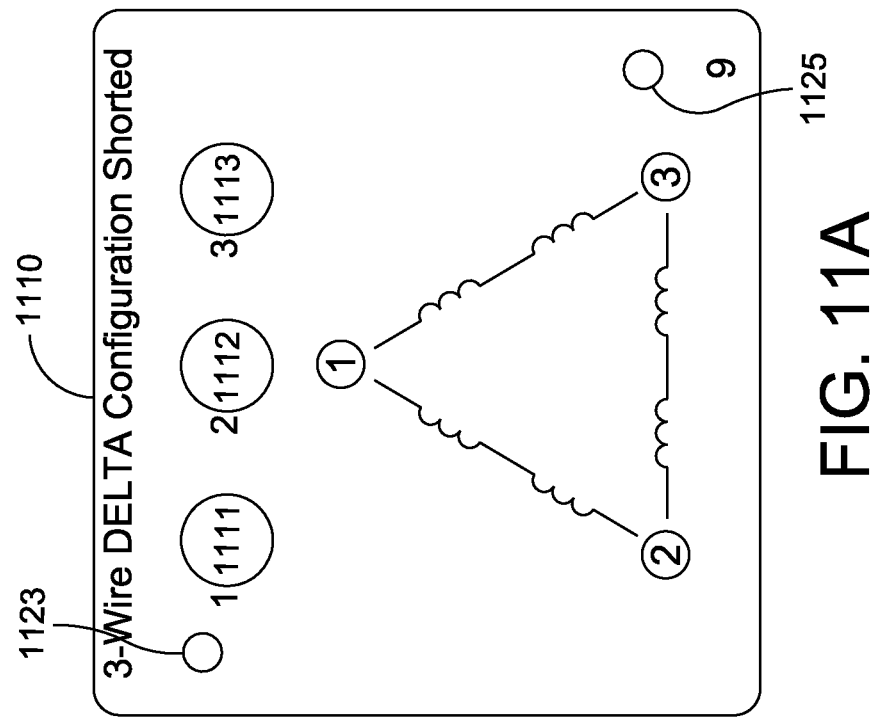
FIG. 11A is a perspective view of the 3-wire delta Configuration Shorted faceplate, according to the present disclosure.

FIG. 11A is a perspective view of the 3-wire delta shorted configuration faceplate 1110, and FIG. 11B is a perspective view of the 3-wire delta shorted configuration cartridge 1130, that corresponds to the faceplate 1110 of FIG. 11A, according to the present disclosure. The faceplate 1110 is configured to be placed on the base 110 on the same manner as faceplate 162 in FIG. 2. The faceplate 1110 is used to connect a 12-lead motor to the three leads identified by the openings 1111, 1112, and 1113 which have adjacent numbers 1, 2, and 3, respectively, to identify which lead connections visible in the openings are to be connected to the 12-lead motor. The faceplate 1110 includes small openings 1123, 1125 that engage, respectively, with the posts 113, 116 on the base 110. The cartridge 1130 would be placed on the base 110 in the same manner as cartridge 164 in FIG. 2, to interface with the receptacle 132/134. The cartridge 1130 includes a table 1135 that provides important data for implementation of the particular configuration.

Figure 11C:
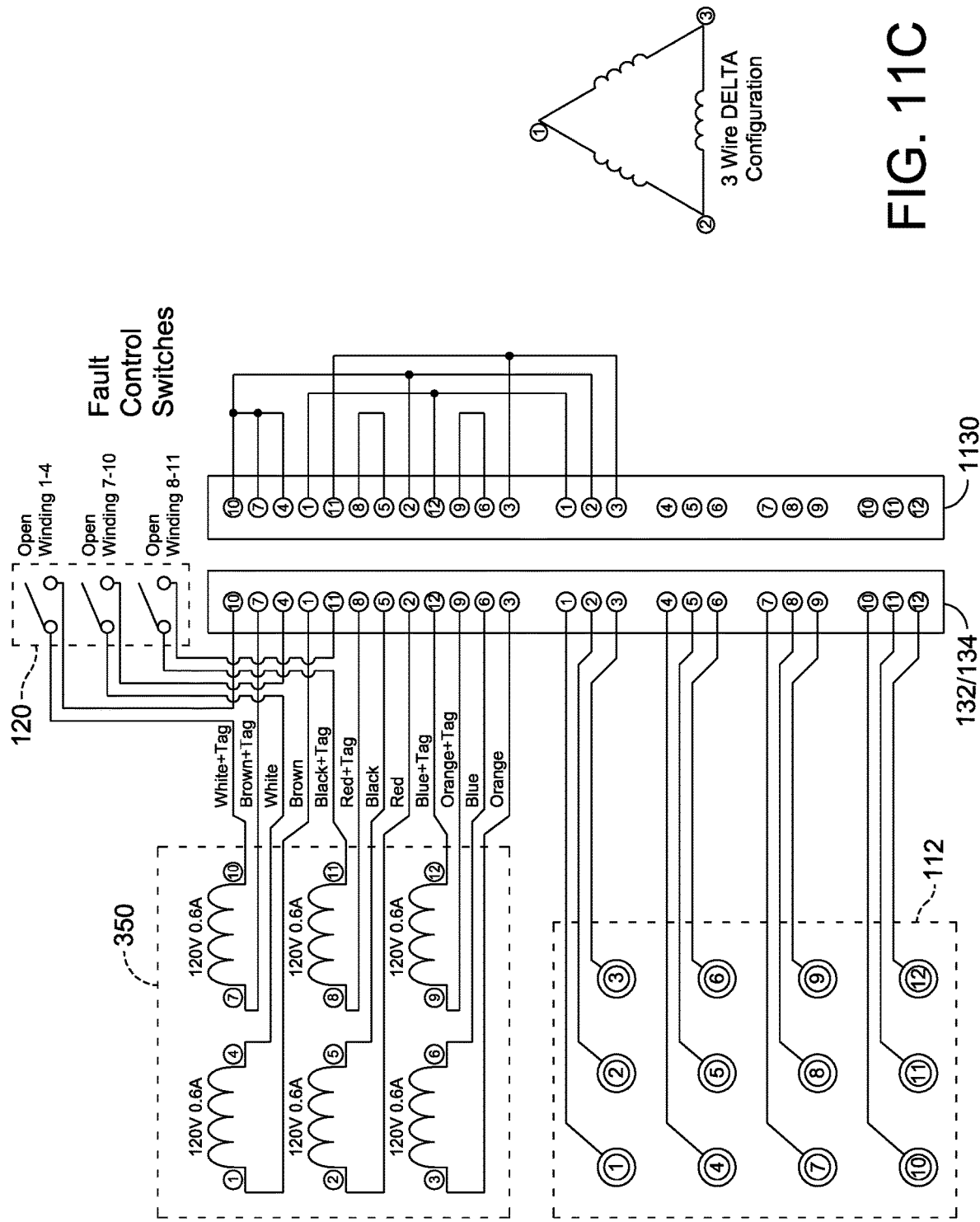
FIG. 11C is a schematic diagram illustrating the configuration for the 3-wire delta Configuration Shorted faceplate and cartridge arrangement, according to the present disclosure.

FIG. 11C is a schematic diagram illustrating the configuration for the 3-wire delta Configuration Shorted faceplate and cartridge arrangement, according to the present disclosure. It should be clear in light of the present disclosure, the faceplate 1110 is configured to cover the leads 112 that are not used during the configuration. The schematic in FIG. 11C illustrates the switches 120 as well as the open windings 350. The switches 120 corresponds to the switches on the base 110 and also simulates faults as open windings. The open windings 350 in FIG. 3C correspond to, and may be the same as or substantially similar to, the open windings 142 of the motor portion 140 (see FIG. 1 and FIG. 2). Note that the cartridge 1130 has the configuration as shown in FIG. 11C and the connectivity to the receptacle 132/134 changes the configuration of the motor windings 350 to be a 3-wire delta configuration.

Figure 12B:
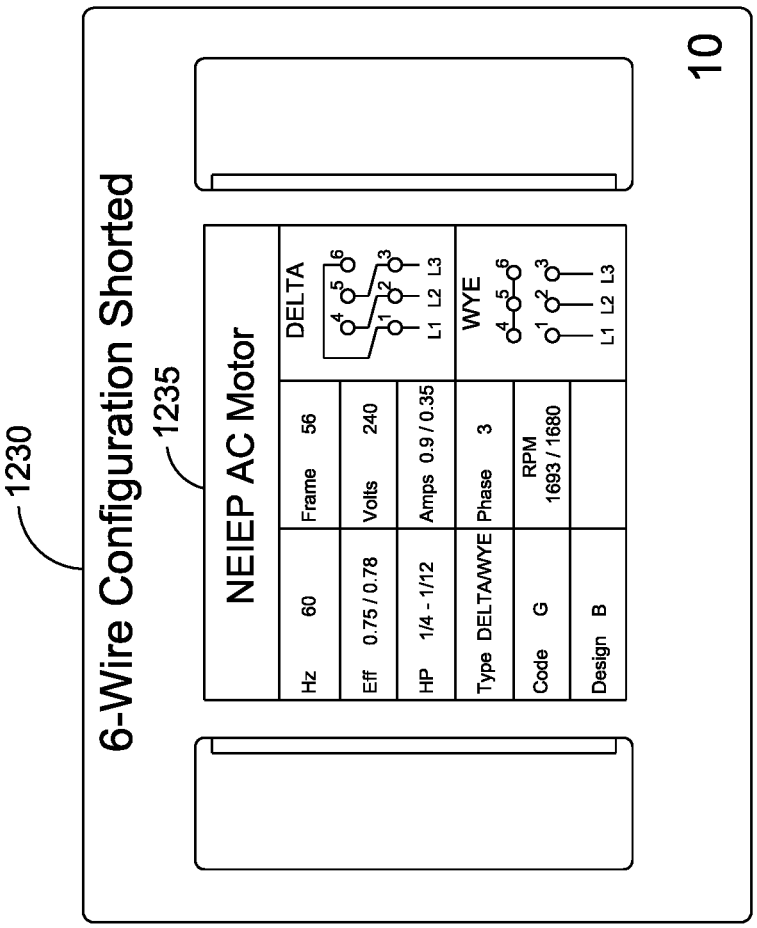
FIG. 12B is a perspective view of the 6-wire shorted configuration cartridge, that corresponds to the faceplate of FIG. 12A, according to the present disclosure.
Figure 12A:
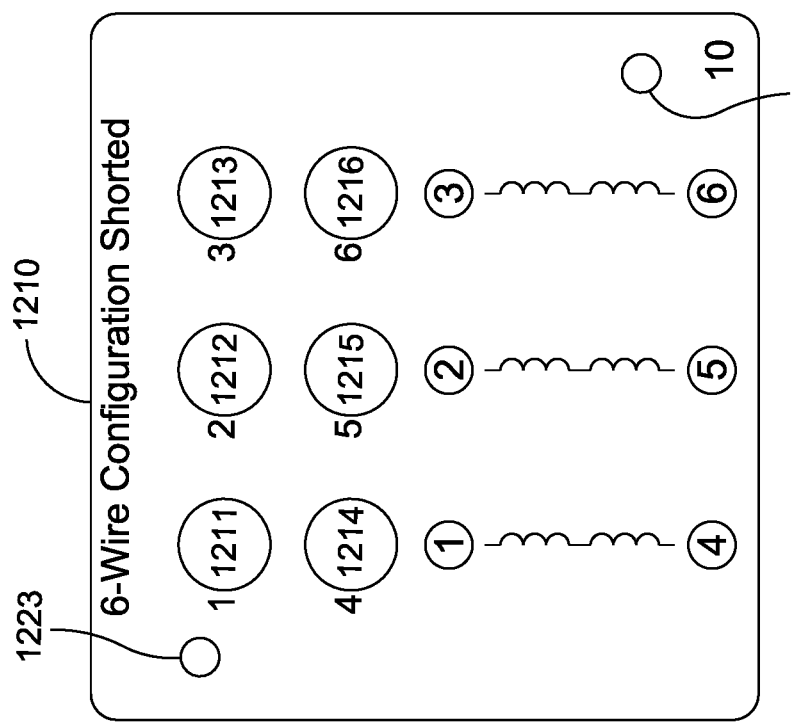
FIG. 12A is a perspective view of the 6-wire shorted configuration faceplate, according to the present disclosure.

FIG. 12A is a perspective view of the 6-wire shorted configuration faceplate 1210, and FIG. 12B is a perspective view of the 6-wire shorted configuration cartridge 1230 that corresponds to the faceplate 1210 of FIG. 12A, according to the present disclosure. The faceplate 1210 is configured to be placed on the base 110 on the same manner as faceplate 162 in FIG. 2. The faceplate 1210 is used to connect a 12-lead motor to the three leads identified by the openings 1211, 1212, 1213, 1214, 1215, and 1216 which have adjacent numbers 1, 2, 3, 4, 5, and 6, respectively, to identify which lead connections visible through the opening are to be connected to the 12-lead motor. The faceplate 1210 includes small openings 1223, 1225 that engage, respectively, with the posts 113, 116 on the base 110. The cartridge 1230 would be placed on the base 110 in the same manner as cartridge 164 in FIG. 2, to interface with the receptacle 132/134. The cartridge 1230 includes a table 1235 that provides important data for implementation of the particular configuration.

Figure 12C:
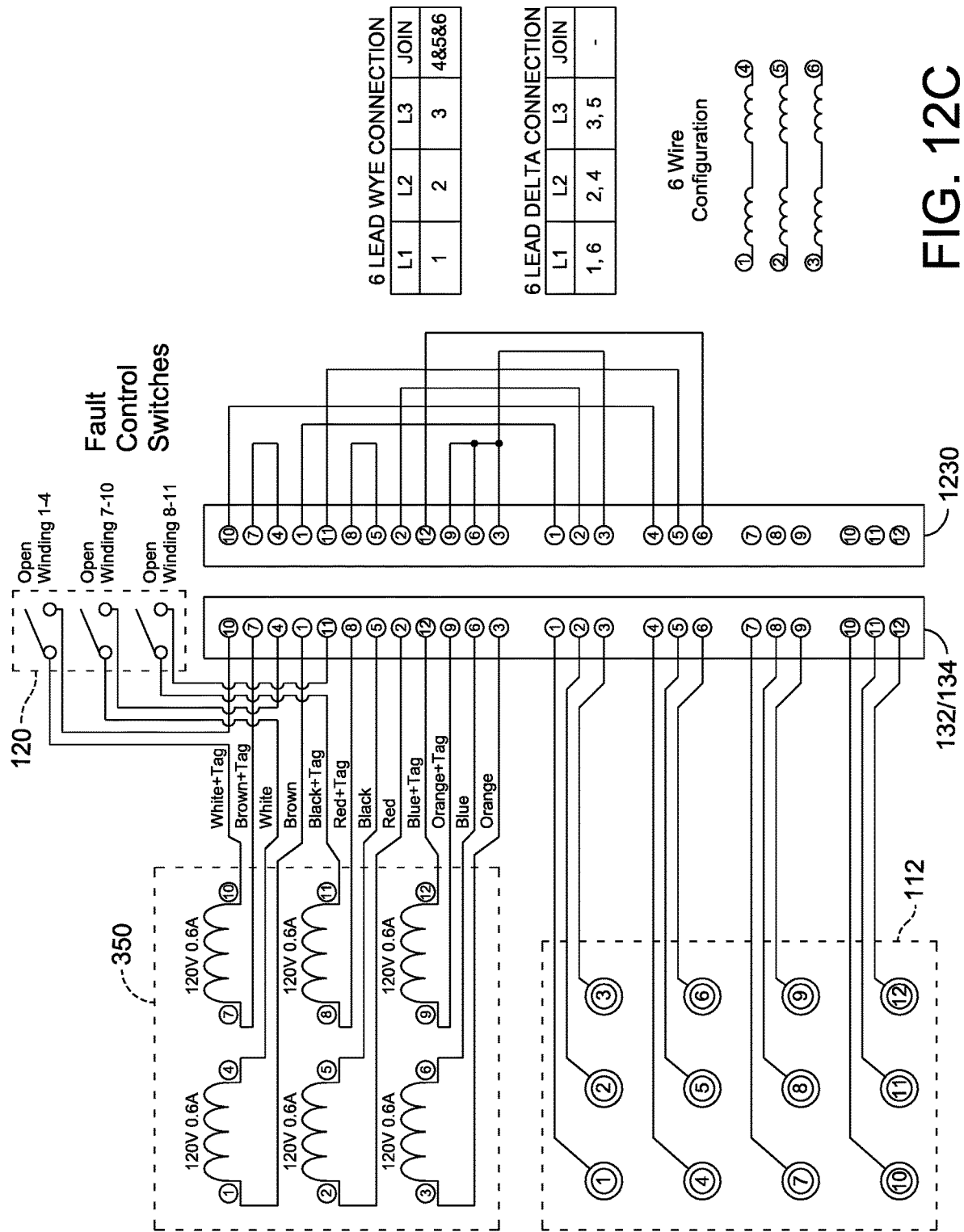
FIG. 12C is a schematic diagram illustrating the configuration for the 6-wire shorted configuration faceplate and cartridge arrangement, according to the present disclosure.

FIG. 12C is a schematic diagram illustrating the configuration for the 6-wire shorted configuration faceplate and cartridge arrangement, according to the present disclosure. It should be clear in light of the present disclosure, the faceplate 1210 is configured to cover the leads 112 that are not used during the configuration. The schematic in FIG. 12C illustrates the switches 120 as well as the open windings 350. The switches 120 correspond to the switches on the base 110 and also simulates faults as open windings. The open windings 350 in FIG. 12C correspond to, and may be the same as or substantially similar to, the open windings 142 of the motor portion 140 (see FIG. 1 and FIG. 2). Note that the cartridge 1230 has the configuration as shown in FIG. 12C and the connectivity to the receptacle 132/134 changes the configuration of the motor windings 350 to be a 6-wire shorted configuration.

Each faceplate and cartridge pair can have a reference number or an identifier, for example in the lower right corner, to identify the pairs that should be used together for a particular motor configuration. For example, faceplate 310 and cartridge 330 can have number '1'; faceplate 410 and cartridge 430 can have number '2'; faceplate 510 and cartridge 530 can have '3'; faceplate 162 and cartridge 164 can have number '4'; faceplate 710 and cartridge 730 can have number '5'; faceplate 810 and cartridge 830 can have number '6'; faceplate 910 and cartridge 930 can have number '7'; faceplate 1010 and cartridge 1030 can have number '8'; faceplate 1110 and cartridge 1130 can have number '9'; and faceplate 1210 and cartridge 1230 can have number '10' for example. Each cartridge simulates a particular configuration and each corresponding faceplate shows the configuration via the graphic, for example, on a front face of the faceplate in most cases.

Figure 13:
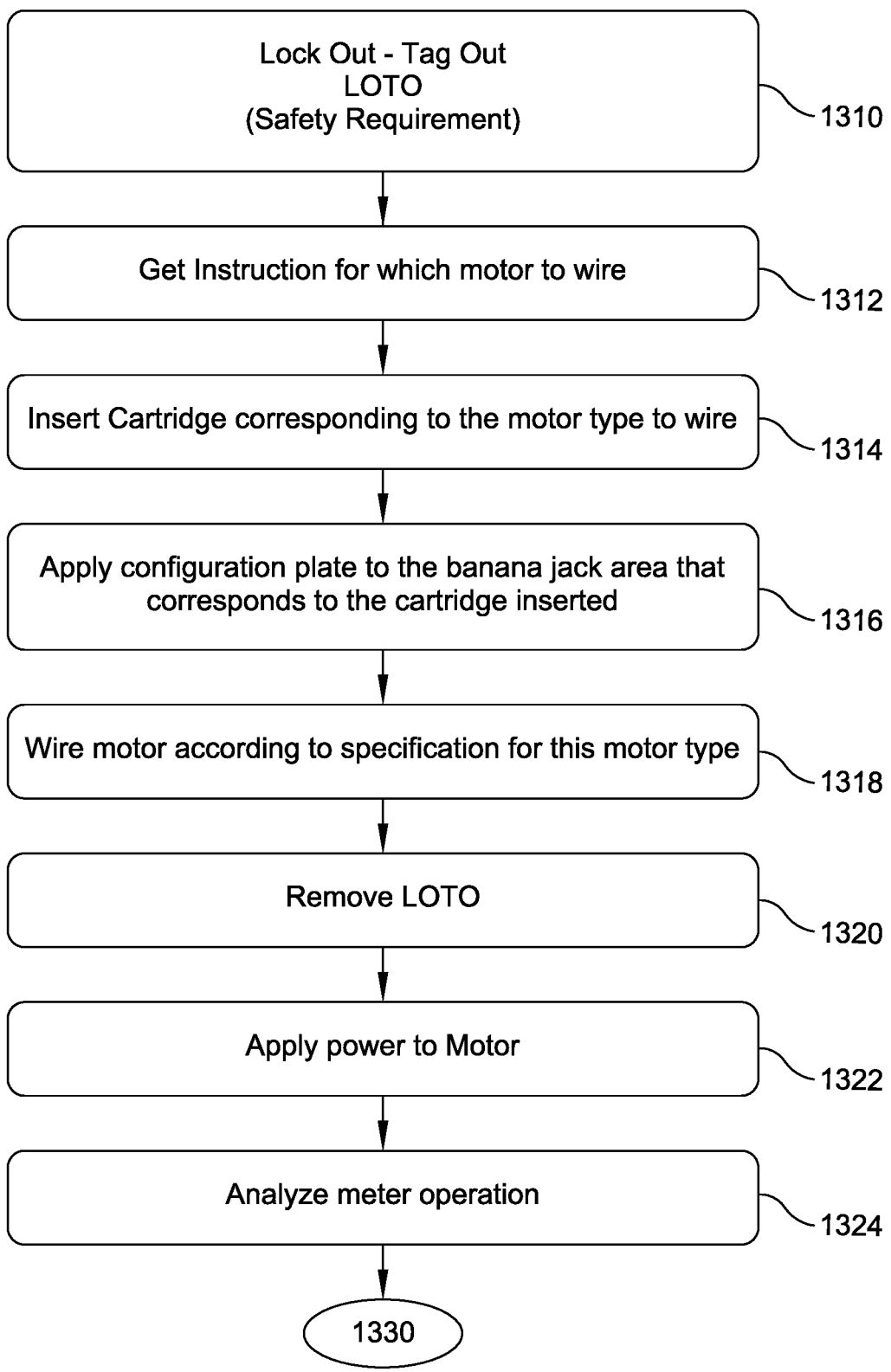
FIG. 13 illustrates a flow chart of a method of emulating multiple AC motor configurations, according to the present disclosure.
Figure 13:
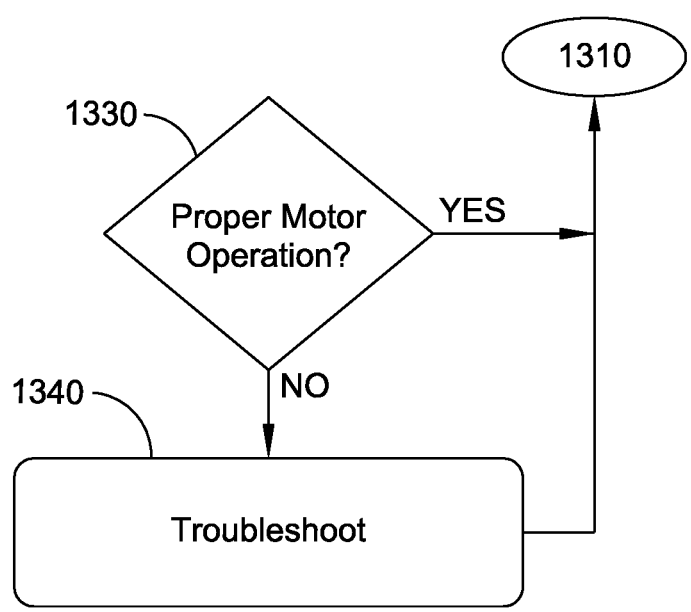

FIG. 13 illustrates a flow chart of a method of emulating multiple AC motor configurations, according to the present disclosure. It will be appreciated that this method is capable of being implemented in an educational environment or a learning environment. For example, in an environment where it is desirable to teach a student about configuring and troubleshooting many AC motors, the features of the present disclosure allow multiple AC configurations to be emulated using a single base and a plurality of interchangeable faceplates and cartridge pairs, in accordance with the techniques of the present disclosure. The method commences at an optional block 1310 which is an optional safety requirement. In this block, a lock out-tag out (LOTO) feature is turned on. LOTO (lock out-tag out) is essentially the process of removing power and ensuring that the power cannot be turned on while work is going on so that power is not inadvertently turned on. The LOTO feature turned on physically restrains all hazardous energy sources that supply power to the system 100.

At block 1312, a student received instructions for which motor to wire. This can be any of the various configurations disclosed herein, including but not limited to (a) at least one 3-wire wye configuration, (b) at least one 3-wire delta configuration, (c) at least one 6-wire configuration, (d) at least one 9-wire wye configuration, (e) at least one 9-wire delta configuration faceplate and cartridge pair. (f) at least one 12-wire configuration faceplate and cartridge pair, (g) at least one 6-wire puzzle configuration faceplate and cartridge pair, (h) at least one 12-wire puzzle configuration faceplate and cartridge pair, (i) at least one 3-wire delta shorted configuration faceplate and cartridge pair, and (j) at least one 6-wire shorted configuration faceplate and cartridge pair.

At block 1314, the appropriate cartridge corresponding to the motor type to be wired is inserted (e.g., cartridge inserted into receptacle 132/134). At block 1316 the appropriate faceplate corresponding to the desired motor configuration is also selected that corresponds to the cartridge.

At block 1318, the motor is then wired according to the specification for the particular motor type. A three-phase power supply is connected to the motor via the lead connections (112 in FIG. 1). The power source is connected into the faceplate area through the lead connections exposed through the openings of the faceplate. At block 1320, the LOTO is then removed (if it was applied at block 1310).

At block 1322, power is applied to the motor. This is accomplished by the lead connections being appropriately connected to the leads of the power supply to drive the motor (e.g., motor windings 142 in FIG. 1). The lead connections can comprise banana jacks in an example embodiment.

At block 1324, the meter operation is analyzed. This is performed by putting a load on the motor and then looking at the electrical characteristics. The change in speed and the current draw are observed, and the system determines if a condition or threshold has been satisfied, such as a particular sound. The direction of spin is observed and the starting characteristics (starting torques) as will be appreciated in light of the present disclosure. The method then advances to block 1330 to make a determination. If the motor is operating properly at block 1330, then the method returns to block 1310 so that another configuration can be emulated and, if necessary, troubleshooting performed. If the motor is not operating properly at block 1330, then troubleshooting occurs at block 1340 and then the process can be repeated from the beginning at block 1310 after troubleshooting efforts are complete.

Having now described a limited number of embodiments of the present invention, it should now be apparent to those skilled in the art that numerous other embodiments and modifications thereof are contemplated as falling within the scope of the present invention, as defined by the appended claims.

The invention claimed is:

1. A system for emulating multiple alternating current (AC) motor configurations in an elevator training environment, the system comprising:
a base having a plurality of lead connections and a receptacle;
a motor portion having motor windings and a flywheel;
wherein the plurality of lead connections and the receptacle are adapted to receive each of a plurality of faceplate and cartridge pairs, respectively, to configure the motor windings according to one of a plurality of configurations.

2. The system of claim 1, wherein each receptacle comprises a 24-pin connection that interfaces with a corresponding 24-pin connection on each cartridge.

3. The system of claim 1, wherein the plurality of configurations for the motor windings available via the plurality of faceplate and cartridge pairs includes:
(a) at least one 3-wire wye configuration faceplate and cartridge pair;
(b) at least one 3-wire delta configuration faceplate and cartridge pair;
(c) at least one 6-wire configuration faceplate and cartridge pair;
(d) at least one 9-wire wye configuration faceplate and cartridge pair;
(e) at least one 9-wire delta configuration faceplate and cartridge pair;
(f) at least one 12-wire configuration faceplate and cartridge pair;
(g) at least one 6-wire puzzle configuration faceplate and cartridge pair;
(h) at least one 12-wire puzzle configuration faceplate and cartridge pair;
(I) at least one 3-wire delta shorted configuration faceplate and cartridge pair; and
(j) at least one 6-wire shorted configuration faceplate and cartridge pair.

4. The system of claim 1, wherein the plurality of lead connections comprises at least twelve connection points for connecting to a motor drive.

5. The system of claim 4, wherein each faceplate has at least one opening corresponding to each lead connection that is used for each of the plurality of configurations.

6. The system of claim 5 wherein each faceplate includes a graphic indicating the motor configuration that corresponds to the respective faceplate.

7. The system of claim 1, further comprising a spring pull gauge operatively connected to the motor portion that is used to measure how much force is applied to a brake of the system.

8. The system of claim 1, wherein the base further comprises a plurality of switches on the base for simulating faults as open windings.

9. A system for emulating multiple alternating current (AC) motor configurations in an elevator training environment, the system comprising:
a base having a plurality of lead connections and a receptacle;
a plurality of cartridges; and
a configurable motor portion having motor windings; and
wherein the plurality of lead connections and the receptacle are adapted to receive each of a plurality of faceplate and cartridge pairs, respectively, to configure the motor windings according to one of a plurality of configurations.

10. The system of claim 9, wherein each of the plurality of cartridges comprises a 24-pin connection that is configured to interface with the receptacle on the base.

11. The system of claim 9, further comprising a spring pull gauge operatively connected to the motor that is used to measure how much force is applied to a brake of the system.

12. A system for emulating multiple alternating current (AC) motor configurations in an elevator training environment, the system comprising:
a base having a plurality of lead connections and a receptacle;
a plurality of cartridges; and
a configurable motor portion having motor windings; and
a plurality of switches on the base for simulating faults such that the switches simulate open windings, and the plurality of cartridges are configured to simulate missing leads.

13. A system for emulating multiple alternating current (AC) motor configurations in an elevator training environment, the system comprising:
a base having a plurality of lead connections and a receptacle;
a plurality of cartridges; and
a configurable motor portion having motor windings; and
a plurality of faceplates that interface with the plurality of lead connections, wherein the plurality of cartridges and the plurality of faceplates comprise a plurality of cartridge and faceplate pairs that provide a different AC motor configuration such that each pair can be interchangeably used to configure the motor portion according to any one of the plurality of AC motor configurations in the elevator training environment.

14. A system for emulating multiple alternating current (AC) motor configurations, the system comprising:
   a base having a plurality of lead connections and at least one receptacle;
   a configurable motor portion having motor windings;
   at least one cartridge configured to connect to the at least one receptacle, the at least one cartridge corresponding to at least one AC motor configuration; and
   at least one faceplate that indicates which of the plurality of lead connections is used for the at least one AC motor configuration.

15. The system of claim 14, further comprising the at least one faceplate corresponding to the at least one cartridge, the at least one faceplate configured to interface with at least some of the plurality of lead connections, the at least one faceplate corresponding to the at least one AC motor configuration, wherein the at least one faceplate indicates which of the plurality of lead connections should be used for the at least one AC motor configuration by covering the lead connections that should not be used.

16. The system of claim 14, further comprising at least a second cartridge configured to connect to the at least one receptacle, the second cartridge corresponding to a second AC motor configuration, different from the at least one AC motor configuration, and at least a second faceplate corresponding to the second cartridge, the second faceplate configured to interface with at least some of the plurality of lead connections.

17. The system of claim 14, wherein the at least one cartridge and the at least receptacle interface via a 24-pin connection.

18. The system of claim 14, including a plurality of configurations for the motor windings available via a plurality of faceplate and cartridge pairs and includes:
   (a) at least one 3-wire wye configuration faceplate and cartridge pair;
   (b) at least one 3-wire delta configuration faceplate and cartridge pair;
   (c) at least one 6-wire configuration faceplate and cartridge pair;
   (d) at least one 9-wire wye configuration faceplate and cartridge pair;
   (e) at least one 9-wire delta configuration faceplate and cartridge pair; and
   (f) at least one 12-wire configuration faceplate and cartridge pair.

19. The system of claim 18, including a plurality of configurations for the motor windings available via a plurality of faceplate and cartridge pairs and further includes:
   (g) at least one 6-wire puzzle configuration faceplate and cartridge pair; and
   (h) at least one 12-wire puzzle configuration faceplate and cartridge pair.

20. The system of claim 19, including plurality of configurations for the motor windings available via a plurality of faceplate and cartridge pairs further includes:
   (I) at least one 3-wire delta shorted configuration faceplate and cartridge pair; and
   (j) at least one 6-wire shorted configuration faceplate and cartridge pair.

21. The system of claim 14 wherein the plurality of lead connections and the at least one receptacle are adapted to receive each of a plurality of faceplate and cartridge pairs, respectively, to configure the motor windings according to one of a plurality of configurations.

* * * * *